US012774755B2

(12) United States Patent
Yuan et al.

(10) Patent No.: US 12,774,755 B2
(45) **Date of Patent: *Oct. 27, 2026**

(54) MODULAR VALVE SYSTEM

(71) Applicant: FISHER JEON GAS EQUIPMENT (CHENGDU) CO., LTD., Chengdu (CN)

(72) Inventors: Jie Yuan, Chengdu (CN); Guolei Fan, Chengdu (CN); Yanwei Lei, Chengdu (CN); Le Wang, Chengdu (CN)

(73) Assignee: FISHER JEON GAS EQUIPMENT (CHENGDU) CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,961

(22) Filed: Feb. 29, 2024

(65) Prior Publication Data

US 2024/0271712 A1 Aug. 15, 2024

Related U.S. Application Data

(63) Continuation of application No. 17/022,837, filed on Sep. 16, 2020, now Pat. No. 11,920,688.

(30) Foreign Application Priority Data

Sep. 25, 2019 (CN) ......................... 201910913289.9
Sep. 25, 2019 (CN) ......................... 201921607105.8

(51) Int. Cl.

*F16K 27/02* (2006.01)
*F16K 17/04* (2006.01)
*F16K 37/00* (2006.01)

(52) U.S. Cl.

CPC .............. *F16K 27/02* (2013.01); *F16K 17/04* (2013.01); *F16K 37/0008* (2013.01)

(58) Field of Classification Search

CPC ...... F16K 27/02; F16K 17/04; F16K 37/0008; F16K 31/1221

See application file for complete search history.

(56) References Cited

U.S. PATENT DOCUMENTS 1,514,975 A 11/1924 Larner
2,265,435 A 12/1941 Kinzie (Continued)

FOREIGN PATENT DOCUMENTS

CN 101072965 A 11/2007
CN 102077005 A 5/2011

(Continued)

OTHER PUBLICATIONS

Extended European Search Report for Application No. 20869596.5, dated Feb. 1, 2024.

(Continued)

*Primary Examiner* — Angelisa L. Hicks
(74) *Attorney, Agent, or Firm* — MARSHALL, GERSTEIN & BORUN LLP

(57) ABSTRACT

A modular valve system includes a modular valve body having an inlet, an outlet, a through-hole, and a fluid flow path between the inlet and the outlet. The modular valve body is used to assemble any one of a pressure regulating valve, a slam-shut valve, or a flow control valve, and the through-hole is configured to receive a component of any one of the pressure regulating valve, the slam-shut valve, and the flow control valve.

20 Claims, 15 Drawing Sheets

(56) References Cited

U.S. PATENT DOCUMENTS

| | | | | |
|---|---|---|---|---|
| 2,725,891 | A * | 12/1955 | De Bourguignon | F16K 1/123 137/219 |
| 3,637,187 | A | 1/1972 | Burger | |
| 3,837,357 | A * | 9/1974 | Slaughter, Jr. | F16K 37/0066 137/554 |
| 4,112,704 | A | 9/1978 | Kaneko | |
| 5,435,336 | A | 7/1995 | Serot | |
| 7,159,614 | B2 | 1/2007 | Tiziani et al. | |
| 7,469,708 | B2 | 12/2008 | Koester | |
| 9,874,287 | B2 | 1/2018 | Brouwer et al. | |
| 2004/0129908 | A1 * | 7/2004 | Booyens | F16K 1/126 251/61.2 |
| 2009/0261281 | A1 | 10/2009 | Mevius et al. | |
| 2013/0200285 | A1 | 8/2013 | Gent | |
| 2014/0261808 | A1 | 9/2014 | Brouwer et al. | |
| 2015/0198263 | A1 | 7/2015 | Ibsen | |
| 2015/0226337 | A1 | 8/2015 | McHugh | |
| 2016/0004256 | A1 | 1/2016 | Volovec | |
| 2018/0283575 | A1 | 10/2018 | Sattelberg et al. | |

FOREIGN PATENT DOCUMENTS

| | | | |
|---|---|---|---|
| CN | 202927178 | U | 5/2013 |
| CN | 103375620 | A | 10/2013 |
| CN | 203442151 | U | 2/2014 |
| CN | 103775701 | A | 5/2014 |
| CN | 104048087 | A | 9/2014 |
| CN | 205715871 | U | 11/2016 |
| CN | 106609873 | A | 5/2017 |
| CN | 108131455 | A | 6/2018 |
| CN | 207648162 | U | 7/2018 |
| CN | 108386547 | A | 8/2018 |
| CN | 108716558 | A | 10/2018 |
| CN | 208634500 | U | 3/2019 |
| CN | 110005828 | A | 7/2019 |
| CN | 111412315 | A | 7/2020 |
| CN | 211117837 | U | 7/2020 |
| CN | 211145501 | U | 7/2020 |
| CN | 111503333 | A | 8/2020 |
| RU | 2241883 | C1 | 12/2004 |
| WO | WO-2019/154404 | A1 | 8/2019 |
| WO | WO-2020/157571 | A1 | 8/2020 |

OTHER PUBLICATIONS

International Search Report and Written Opinion, corresponding International Application No. PCT/IB2020/000765, mailing date Feb. 10, 2021.

First Office Action for Chinese Application No. 201910899887.5, dated Dec. 3, 2024.

First Office Action for Chinese Application No. 201910913289.9, dated Dec. 18, 2024.

Decision of Rejection for Chinese Application No. 201910913289.9, dated Aug. 29, 2025.

Second Office Action for Chinese Application No. 201910913289.9 dated Jun. 17, 2025.

* cited by examiner

II-II

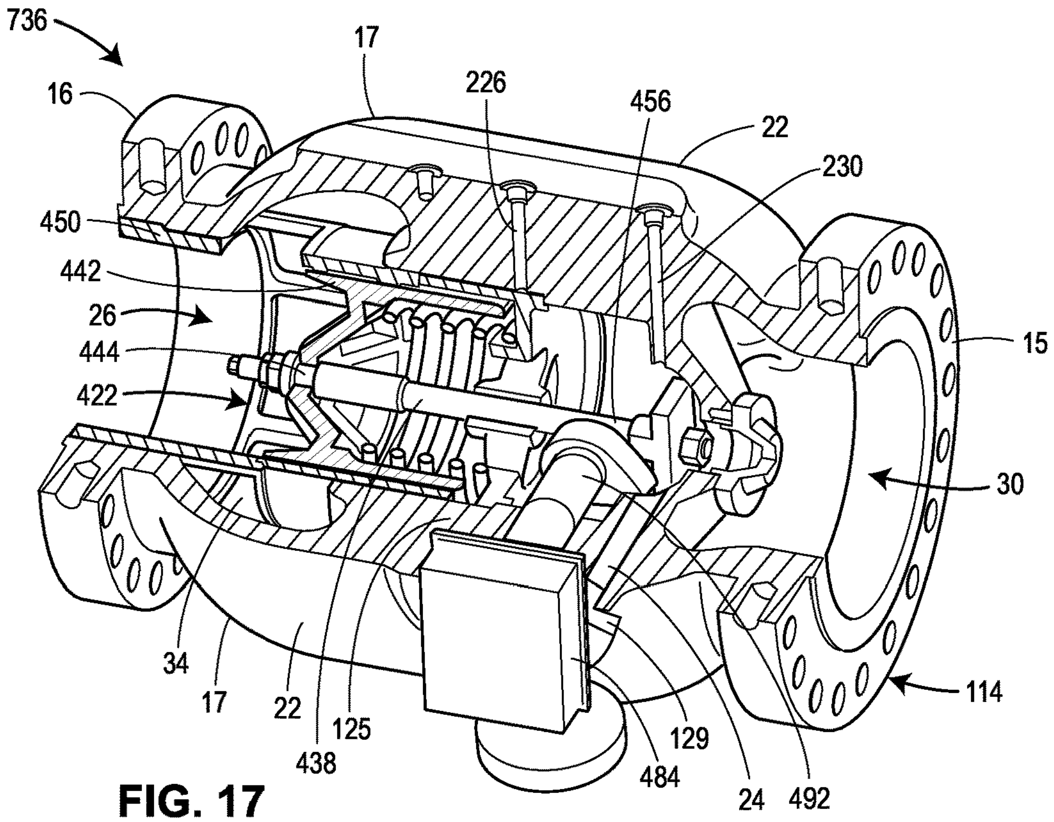
FIG. 17
FIG. 18
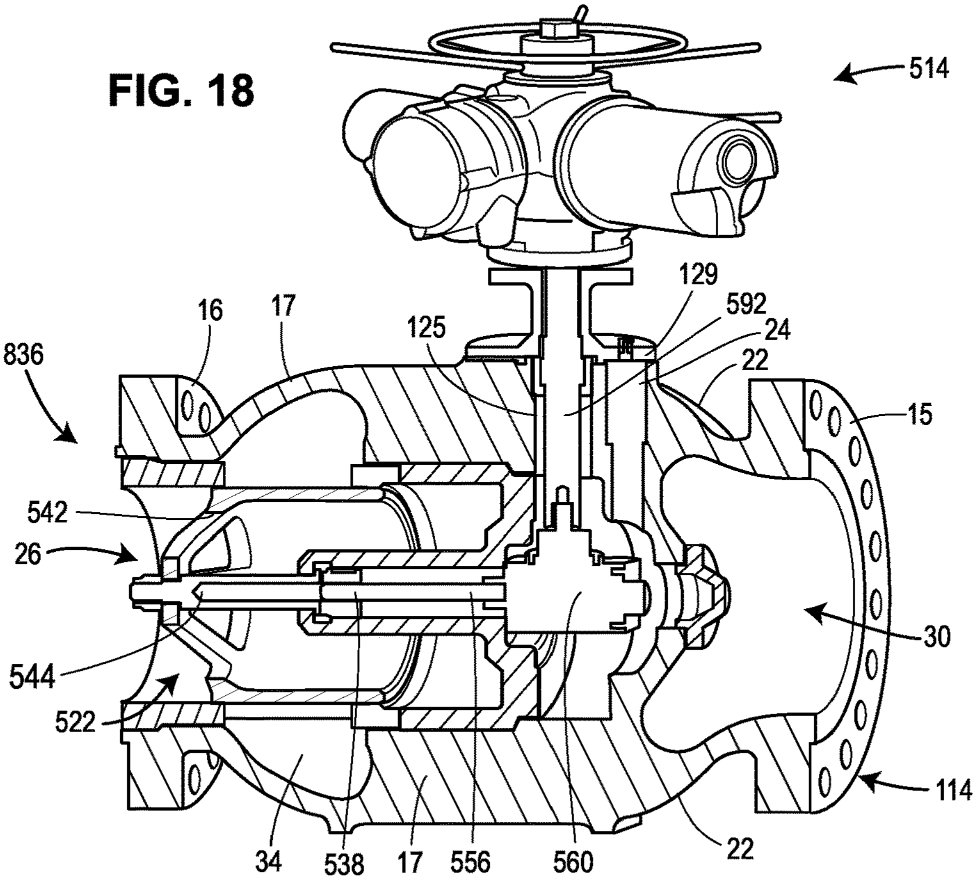

MODULAR VALVE SYSTEM

CROSS-REFERENCE TO RELATED APPLICATION

This application is a continuation of U.S. patent application Ser. No. 17/022,837, which was filed on Sep. 16, 2020, and is hereby incorporated herein by reference in its entirety.

TECHNICAL FIELD

The present disclosure relates to a modular valve system, and in particular, to a modular valve system having a valve body configured to be used with any one of a pressure regulating valve, a slam-shut valve, and a flow control valve.

BACKGROUND

Industrial processing plants use various well known valves, including any one of a pressuring regulating valve, a slam-shut valve, and a flow control valve, in a wide variety of applications, such as to control fluid flow (e.g., gas, liquid) in a processing operation. However, each of the pressure regulating valve, the slam-shut valve, and the fluid control valve has a unique valve body requiring different components, including a plurality of mounting flanges and flange bolts along with other accessories tailored to the unique valve body. A lack of standardized or generalized components that may be used with one or more of each of the pressure regulating valve, the slam-shut valve, and the fluid control valve contributes to increased production costs for each of the valve systems. In addition, installation and maintenance of each of the valves is also time consuming and costly due to the unique configurations.

SUMMARY

In accordance with a first exemplary aspect, a modular valve system may include a valve body having an inlet, an outlet, a through-hole, and a fluid flow path between the inlet and the outlet. The valve body may be used to assemble any one of a pressure regulating valve, a slam-shut valve, or a flow control valve. In addition, the through-hole may be configured to receive a component coupled to or of any one of the pressure regulating valve, the slam-shut valve, and the flow control valve.

In accordance with a second exemplary aspect, a modular valve system may include a valve body having an inlet, an outlet, a first through-hole, a second through-hole, and a fluid flow path between the inlet and the outlet. The valve body may be used to assemble any one of a pressure regulating valve, a slam-shut valve, or a flow control valve. In addition, one of the first through-hole or the second through-hole may be configured to receive a component coupled to or of any of the pressure regulating valve, the slam-shut valve, and the flow control valve.

In further accordance with any one of the foregoing exemplary aspects, a modular valve system may further include any one or more of the following preferred forms.

In a preferred form, the valve body may include a first end, a second end, and a radial portion disposed between the first and second ends, the through-hole may be disposed in the radial portion.

In a preferred form, the component the through-hole is configured to receive may be any one of a portion of a travel indicator assembly coupled to the pressure regulating valve, an actuator shaft coupled to the slam-shut valve, and an actuator shaft coupled to the flow control valve, and the valve body may be configured to receive any one of an actuator assembly of the pressure regulating valve and a valve assembly of one of the slam-shut valve or the flow control valve.

In a preferred form, the valve body may further include an outer wall in which the through-hole may be disposed, and a bore may be disposed between the inlet and the outlet.

In a preferred form, the valve body may further include an inner wall disposed within the bore, a portion of the fluid flow path may be disposed between the inner wall and the outer wall.

In a preferred form, the through-hole may have a first end and a second end disposed opposite the first end, the first end may be disposed at and extending into the outer wall of the valve body and the second end may be disposed at and extending into the bore.

In a preferred form, the through-hole may include a first through-hole, and the valve body may further include a second through-hole, the second through-hole may have a first end and a second end disposed opposite the first end, the first end may be disposed at and extending into an outer wall of the valve body and the second end may be disposed at and extending into the bore.

In a preferred form, the through-hole may include a first through-hole, and the valve body may further include a second through-hole, wherein one of the first through-hole or the second through-hole may be adapted to receive a plug when the other of one of the first through-hole or the second through-hole receives the component coupled to or of any one of the pressure regulating valve, the slam-shut valve, or the flow control valve.

In a preferred form, the first through-hole may be adapted to receive a plug and the second-through hole may be adapted to receive an actuator shaft coupled to or of one of the slam-shut valve or the flow control valve.

In a preferred form, the first through-hole may be adapted to receive a portion of a travel indicator assembly coupled to or of the pressure regulating valve, and the second through-hole adapted to receive a plug.

In a preferred form, the modular valve system may further include a valve disc subassembly adapted to be disposed near the inlet of the valve body when the valve disc subassembly is assembled with the valve body, and each of the pressure regulating valve, the slam-shut valve, and the flow control valve may use the valve disc assembly when assembled with the valve body.

In a preferred form, the valve body may further include a first channel and a second channel, each of the first channel and the second channel may be disposed through the outer wall and terminating in the bore to provide an external fluid connection with a pathway of a fluid control device, the second channel may be disposed closer to the end of the valve body and adjacent to the first channel.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

FIG. 17 is a perspective view of the modular valve system of FIG. 15 used with a slam-shut valve; and FIG. 18 is a perspective view of the modular valve system of FIG. 15 used with a flow control valve.

DETAILED DESCRIPTION

A new modular valve system having an integrated product platform, such as an axial flow valve body, may be used to assemble any of pressure regulating valves, slam-shut valves, and flow control valves. These three valves, for example, share the same modular valve body, fluid passages, valve disc subassembly, for example, and can accommodate similarly constructed valve trims, such as actuator assemblies and valve assemblies, within the valve body of the modular valve system. In one example, the valve body may include one or two through-holes, one of which may be reserved for a component of any one of the three valves depending upon the function of the valve body, and other of which is blocked, as explained more below.

Figure 1:
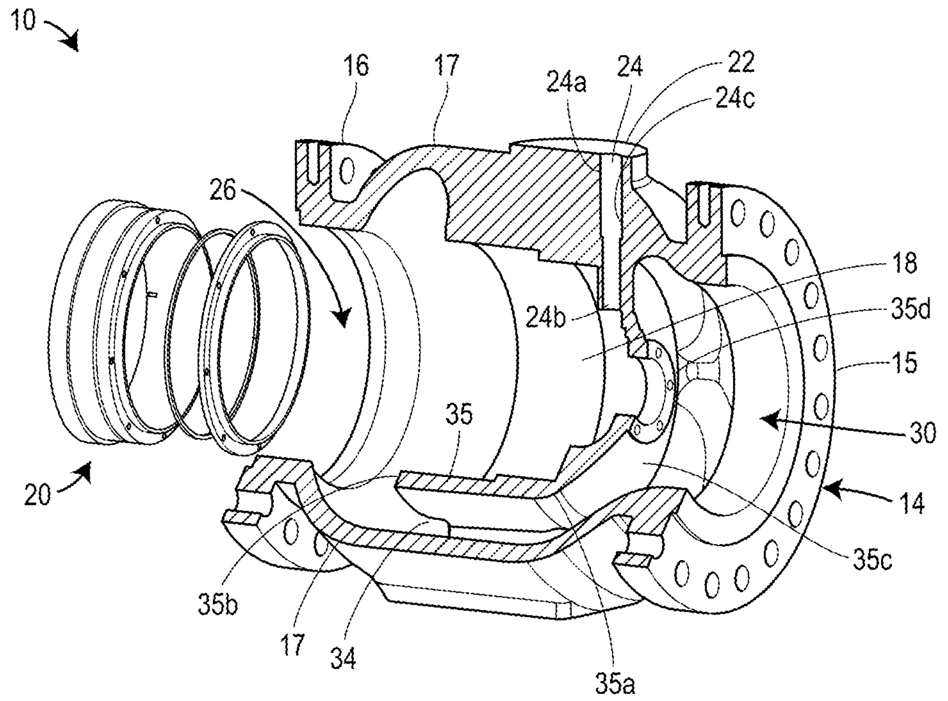
FIG. 1 is a perspective cross-sectional view of a modular valve system assembled in accordance with the teachings of the present disclosure.

More specifically, and referring now to FIG. 1, a modular valve system 10 in accordance with the teachings of the present disclosure is depicted. The modular valve system 10 includes a valve body 14, such as a modular, axial flow valve body, having a first end 15, a second end 16, an outer wall 17, and a central bore 18 disposed between the first end 15 and the second end 16. In one example, the outer wall 17 may be a substantially cylindrical wall, as partially depicted in FIG. 1. However, the outer wall 17 may alternatively take the form, in whole or part, of various other shapes and still fall within the scope of the present disclosure. The bore 18 formed in the valve body 14 is centered on a longitudinal axis X of the valve body 14.

A valve disc subassembly 20 is disposed near the second end 16 of the valve body when the valve disc subassembly 20 is assembled with the valve body 14, as explained more below. Generally, the valve disc subassembly 20 interacts with a portion of the valve body 14, and a control element moves between a closed position and an open position to control fluid flow within a fluid control device. In addition, the valve disc subassembly 20 may be used with any one of a number of fluid control valves, such as a regulator, a slam-shut valve, and a flow control valve assembled with the valve body 10, as also explained below.

The valve body 14 further includes a radial portion 22, which may be disposed on the outer wall 17 of the valve body 14 between the first and second ends 15, 16 of the valve body 14. The valve body 14 also includes a through-hole 24, which may be disposed in the radial portion 22 of the valve body 14, for example. The through-hole 24 is adapted to receive a component of any one of a variety of different fluid control valves, such as a regulator, a slam-shut valve, and a flow control valve, as explained more below. The valve body 14 further defines an inlet 26, an outlet 30, and a flow path 34 connecting the inlet 26 and the outlet 30. The flow path 34 is peripherally disposed relative to the bore 18.

As further depicted in FIG. 1, the through-hole 24 includes a first end 24*a* disposed at and extending into the outer wall 17 of the valve body 14 and a second end 24*b* disposed opposite the first end 24*a*. The second end 24*b* of the through-hole 24 is disposed at and extending into the bore 18 of the valve body 14, providing easy access for a component of any of one a variety of fluid control valves to fit into the through-hole 24, for example. In addition, the through-hole 24 may also include a stepped portion 24*c*, which may assist in securing one or more components of any of the regulator, the slam-shut valve, and the flow control valve assembled with the valve body 14, for example.

In addition, the valve body 14 of the modular valve system 10 may further include an inner wall 35 disposed within and helping define the bore 18. The inner wall 35 also helps define a portion of the flow path 34 or the flow path 34 disposed between a portion of the outer wall 17 and the inner wall 35. Said another way, the flow path 34 is disposed within the valve body 14 between the first and second ends 15, 16 of the valve body 14 and is peripherally disposed relative to the bore 18.

In one example, the inner wall 35 is a cylindrical wall disposed about the longitudinal axis X of the bore 18, as depicted in FIG. 1. However, the inner wall 35 may alternatively take the form of various other shapes and still fall within the scope of the present disclosure. The inner wall 35 has a first end 35*a* disposed near the first end 15 of the valve body 14, and a second end 35*b* disposed near the second end 16 of the valve body 14. A cap portion 35*c* having a center aperture 35*d* may be attached to the first end 35*a* of the inner wall 35. When the inner wall 35 is the cylindrical wall, the cap portion 35*c* may substantially enclose the first end 35*a* of the cylindrical wall 35. In addition, the second end 35*b* of the inner wall 35 is open, allowing one or more portions of any number of fluid control valves, e.g., regulator, slam-shut valve, and flow control valve, to be inserted into the bore 18 of the valve body 14 along the an inside portion of the inner wall 35 of the valve body 14. So assembled, the flow path 34 is separate from the bore 18 and disposed on an outside portion of the inner wall 35 of the valve body 14.

Figure 2:
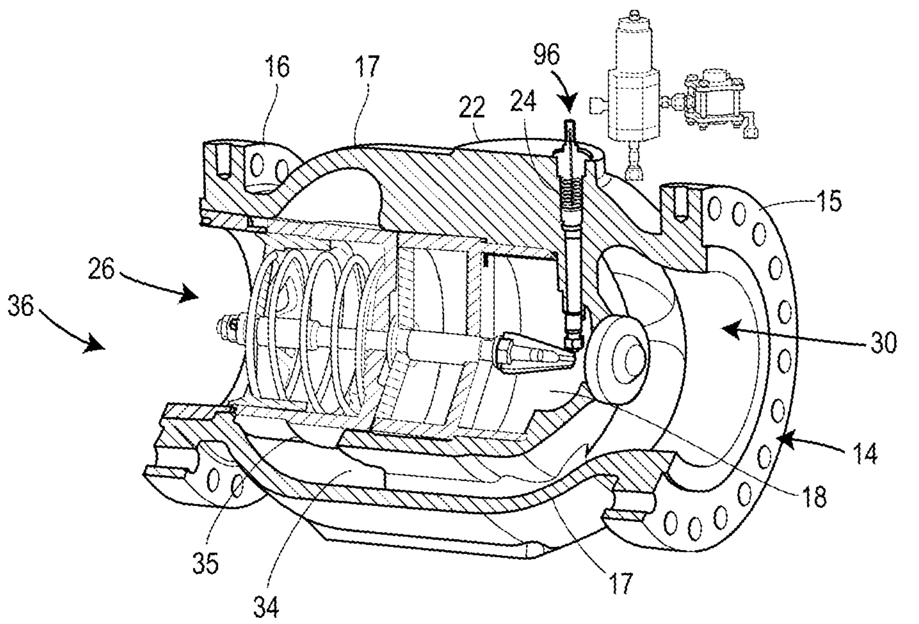
FIG. 2 is perspective cross-sectional view of the modular valve system of FIG. 1 used with a pressure regulating valve, such as a regulator.

Referring now to FIG. 2, an exemplary fluid control valve is assembled with the valve body 14 of the modular valve system 10 of FIG. 1. More specifically, the valve body 14 is used to assemble the pressure regulating valve 36, such as a regulator 36. Components of the pressure regulating valve 36 are inserted into the bore 18 of the valve body 14, and a portion of an indicator assembly 96 coupled to the pressure regulating valve 36 is inserted into the through-hole 24, as described more below. An external pilot 25 is assembled on the valve body 14. So configured, the pressure regulating valve 36 uses both the flow path 34 and the valve disc subassembly 20 (not shown) during operation, like any of the other fluid control valves described herein capable of being assembled with the valve body 14 of the present disclosure.

Figure 3:
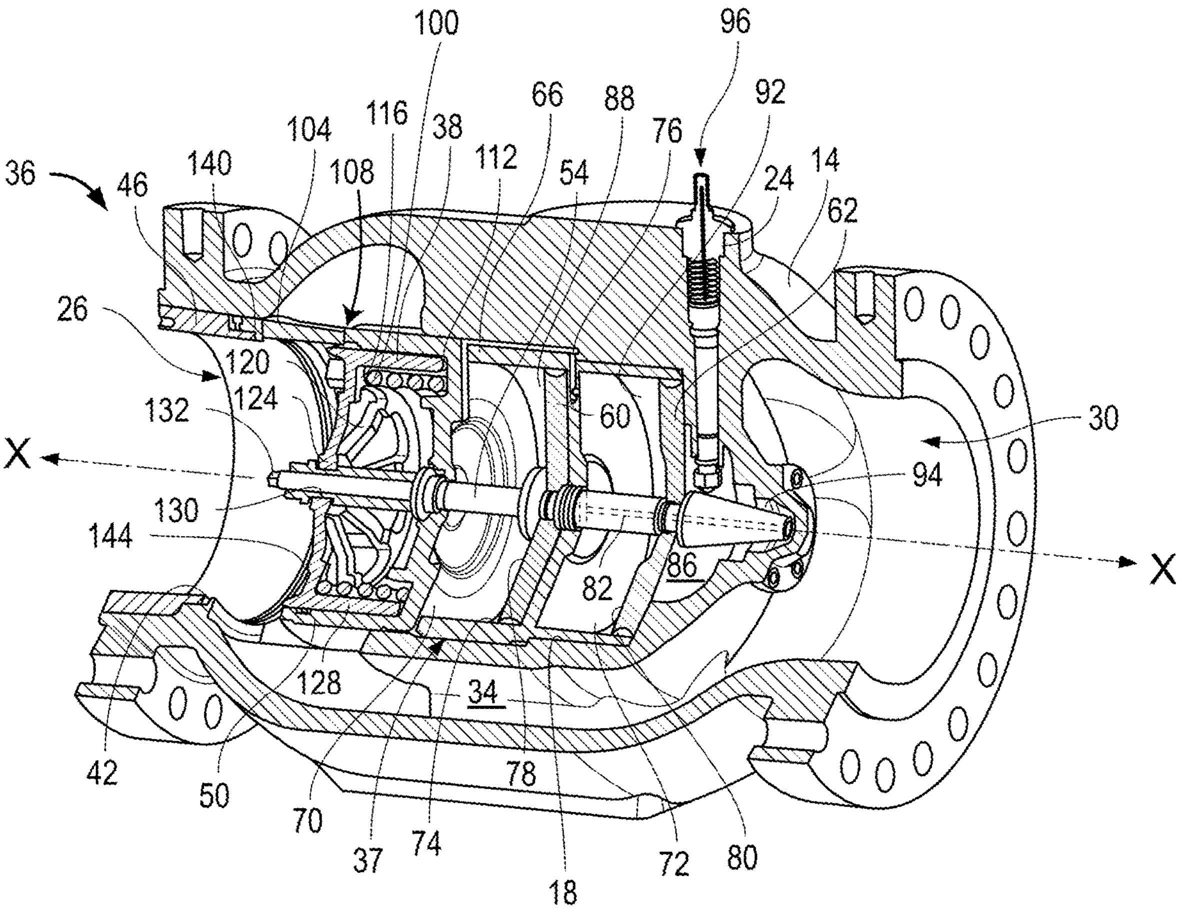
FIG. 3 is a perspective cross-sectional view of the modular valve system and regulator of FIG. 2, showing the regulator in a fully open position.
Figure 4:
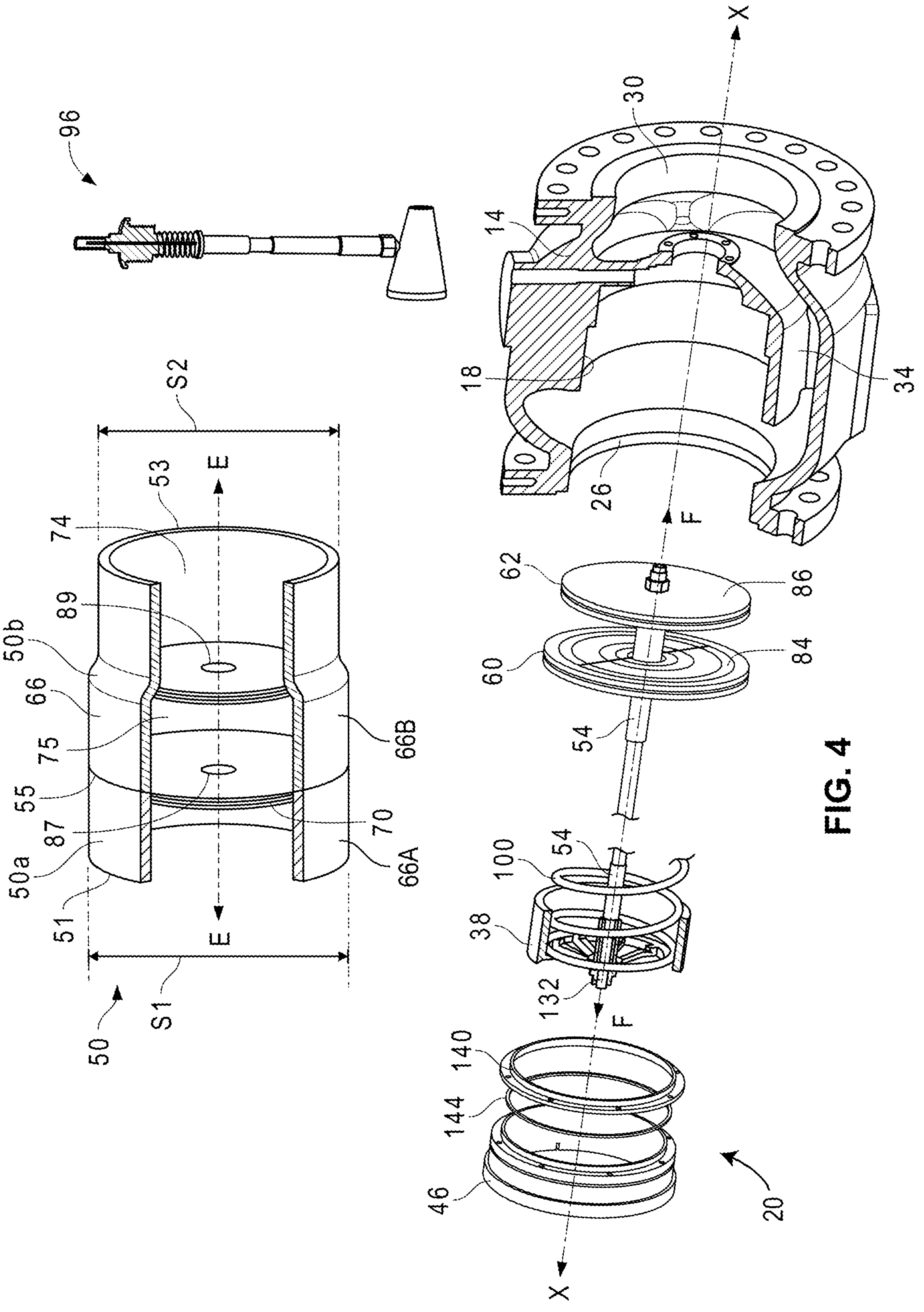
FIG. 4 is a partial, exploded, perspective cross-sectional view of the regulator of FIG. 3.
Figure 5:
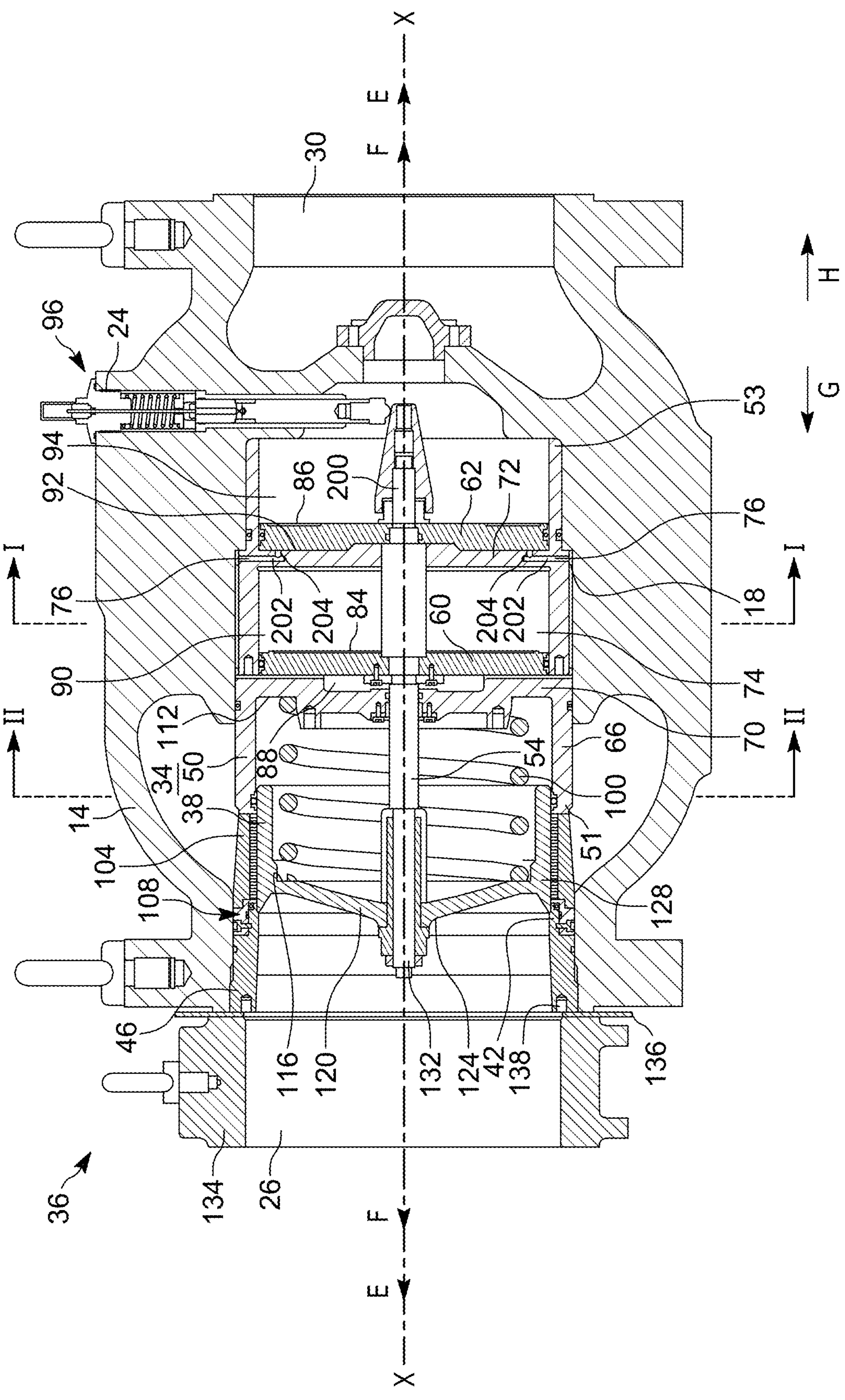
FIG. 5 is a front cross-sectional view of the regulator of FIG. 3, showing the regulator in a closed position.

Referring now to FIGS. 3-5, various additional components of the pressure regulating valve 36 assembled with the valve body 14 of the modular valve system 10 are depicted. Specifically, the pressure regulating valve 36 is assembled with the valve body 14 having the central bore 18 and an actuator assembly 37 disposed in the bore 18. A control element 38 is movable relative to the valve body 14 between a closed position (FIG. 3), in which the control element 38 engages a valve seat 42 disposed in the flow path 34, and an open position (FIG. 1), in which the control element 38 is spaced away from the valve seat 42. The actuator assembly 37 is operatively coupled to the control element 38 and is configured to move the control element 38 axially along the longitudinal axis X to open and close the regulator 10. An inlet fitting 46, which is part of the valve disc subassembly 20 (see, e.g., FIG. 4) of the modular valve system 10, is coupled to the valve body 14 at the inlet 26 and is configured to retain the actuator assembly 37 and the control element 38 within the bore 18 of the valve body 14.

The inlet fitting 46 is removably coupled to the valve body 14. For example, external threads on the inlet fitting 46 may couple to internal threads in the inlet 26 of the valve body 14. Similarly, the inlet fitting 46 may be bolted to the inlet 26 of the valve body 14. Because the inlet fitting 46 is removable from the valve body 14, the internal components (e.g., the actuator assembly 37 and the control element 38) of the regulator 10 are insertable and removable through the inlet 26 and into the valve body 14 of the modular valve system 10. However, in another example, the inlet 26 and the outlet 30 may be switched (i.e., such that fluid flows from the right to the left in FIGS. 3-5) in which case the internal components of the regulator 10 would be removably disposed through the outlet 30 of the valve body 14. In either example, the valve body 14 may be a single-cast (e.g., integrally formed) valve body 14.

The actuator assembly 37 includes a sleeve 50, a stem 54 extending through the sleeve 50, a first piston 60 coupled to the stem 54, and a second piston 62 coupled to the stem 54 and spaced away from the first piston 60. The sleeve 50, the stem 54, or both the sleeve 50 and the stem 54 provide pathways to permit internal fluid communication to actuate the actuator assembly 37. As shown in FIG. 4, the sleeve 50 includes separable first and second sleeve portions 50*a*, 50*b*. The first sleeve portion 50*a* has a cylindrical wall 66*a* and a first plate 70 and the second sleeve portion 50*b* has a cylindrical wall 66*b* and a second plate 72. When the first and second sleeve portions 50*a*, 50*b* are positioned adjacent to each other as shown in FIG. 4, they collectively form the sleeve 50 in which the first plate 70 is spaced from the second plate 72 (FIG. 3). The cylindrical walls 66*a*, 66*b* (together forming a wall labeled as 66) and the first and second plates 70, 72 define a first cavity 75 in which the first piston 60 is slidably disposed, and a second cavity 74 in which the second piston 62 is slidably disposed. As shown in FIGS. 3 and 5, and described in more detail below, a pathway 76 is formed in the cylindrical wall 66 of the sleeve 50 to provide fluid communication between an upstream surface 78 of the first piston 60 and an upstream surface 80 of the second piston 62. Also described further below, the stem 54 includes a passage 82 (shown in dashed lines in FIG. 3) extending partially through the stem 54 that provides fluid communication between a downstream 84 surface of the first piston 60 and a downstream surface 86 of the second piston 62. As used herein, the term "upstream" refers to a side facing the inlet 26 (i.e., upstream of the flow path 34), and the term "downstream" refers to a side facing the outlet 30 (i.e., downstream the flow path 34).

As shown in FIG. 4, the internal components of the regulator 36 are configured to align with the longitudinal axis X of the valve body 14. The sleeve 50 is particularly constructed to align the stem 54, the first piston 60, and the second piston 62 with the control element 38 such that the actuator assembly 37 and the control element 38 are properly aligned within the bore 18 of the valve body 14. For example, the first plate 70 and the second plate 72 each define an aperture 87, 89, respectively, that is aligned with a longitudinal axis E of the sleeve 50. The longitudinal axis E is coaxial with the longitudinal axis X of the valve body 14 when the sleeve 50 is disposed in the bore 18. The cylindrical wall 66 of the sleeve 50 is shaped to substantially match a contoured wall defining the bore 18 of the valve body 14 so that the sleeve 50 is properly in axial alignment when the sleeve 50 is fully inserted into the valve body 14. The sleeve 50 includes a first end 51 and a second end 53. In the illustrated embodiment, the first end 51 has an inner diameter $S_1$ that is different than an inner diameter $S_2$ of the second end 53. In other embodiments, however, different sleeve geometries might be used to correspond to different geometries of the bore 18. The inner diameter $S_1$ of the first end 51 is sized and shaped to slidably receive the control element 38. The second end 53 is configured to abut against an inner wall of the valve body 14 such that the internal components of the regulator 36 are secured (e.g., clamped) in place when the inlet fitting 46 is secured to the valve body 14. When the control element 38 is in the fully open position, the second piston 62 is adjacent to the second end 53 of the sleeve 50.

The first and second pistons 60, 62 are configured to slide together against a smooth interior surface of the cylindrical wall 66 of the sleeve 50 in response to changes in pressure sensed by the actuator assembly 37. The first and second pistons 60, 62 are securely attached to the stem 54 such that the stem 54 and pistons 60, 62 move relative to the sleeve 50 while the sleeve 50 remains in a fixed position relative to the valve body 14. The stem 54 has a longitudinal axis F that is arranged to align with the longitudinal axis X of the valve body 14. As discussed further below, a plurality of chambers 88, 90, 92, and 94 are formed between the sleeve 50 and the first and second pistons 60, 62 and have varying internal volumes when the regulator 36 opens and closes. In particular, as shown in FIG. 5, a first chamber 88 is disposed between the first plate 70 of the sleeve 50 and the first piston 60, a second chamber 90 is disposed between the first piston 60 and the second plate 72 of the sleeve 50, a third chamber 92 is disposed between the second plate 72 of the sleeve 50 and the second piston 62, and a fourth chamber 94 is disposed downstream of the second piston 62. The fourth chamber 94 is partially defined by the cylindrical wall 66 of the sleeve 50 and the valve body 14. A travel indicator assembly 96 is partially disposed in the fourth chamber 94 and provides a visual indication of the position (e.g., partially open, fully open, closed) of the regulator 36.

Generally, the indicator assembly 96 is operatively coupled to the regulator 36 and provides a visual display based on the position of the regulator 36. The visual display is externally located relative to the valve body 14 of the modular valve system 10, so that an operator will understand the position of the control element 38 from a distance. Specifically, the indicator assembly 96 is operatively coupled to the stem 54, so that when the control element 38 moves between the open and closed positions, the stem 54 causes the indicator assembly 96 to display a change in position of the control element 38. The indicator assembly 96 is at least partially disposed in the through-hole 14, such as a radial through-hole, formed in the valve body 14 (as described above relative to FIG. 3, for example).

In operation, the actuator assembly 37 actuates the control element 38 between the open position and the closed position in response to the balance of fluid pressures in the first, second, third, and fourth chambers 88, 90, 92, and 94 operating on the first and second pistons 60, 62. In the illustrated example, the first and third chambers 88, 92 are in fluid communication via the pathway 76 formed in the sleeve portions 50*a*, 50*b* (as described below), and the second and fourth chambers 90, 94 are in fluid communication via the passage 82 of the stem 54. Fluid pressure in the first and third chambers 88, 92 operates on the upstream surfaces 78, 80 of the first and second pistons 60, 62, respectively, to urge the first and second pistons 60, 62 in a first direction H toward the open position of the regulator 10. Fluid pressure in the second and fourth chambers 90, 94 operates on the downstream surfaces 84, 86 of the first and second pistons 60, 62, respectively, to urge the first and second pistons 60, 62 in a second direction G (opposite the first direction H) toward the closed position of the regulator 10.

The chambers 88, 90, 92, and 94 of the regulator 36 may be defined in relation to the location of the inlet 26 and the outlet 30, and generally in the direction of fluid flow. For example, fluid flows generally in the direction from the inlet 26 and towards the outlet 30 such that the first chamber 88 is an upstream chamber (i.e., the first upstream chamber 88) to the first piston 60 and the second chamber 90 is a downstream chamber (i.e., the first downstream chamber 90) to the first piston 60. Similarly, the third chamber 92 is an upstream chamber (i.e., the second upstream chamber 92) to the second piston 62 and the fourth chamber 94 is a downstream chamber (i.e., the second downstream chamber 94) to the second piston 62. Through the pathways in the sleeve 50 and/or stem 54, the first and second upstream chambers 88, 92 are in fluid communication with each other, and the first and second downstream chambers 90, 94 are in fluid communication with each other.

Still referring to FIGS. 3-5, the regulator 36 further includes a spring 100, a valve cage 104, and a seal assembly 108 secured in the valve body 14 by the inlet fitting 46. The spring 100 is disposed between a spring seat 112 formed in the first plate 70 of the sleeve 50 and a spring seat 116 formed in the control element 38. As shown in FIGS. 3 and 5, the control element 38 includes a plurality of spokes 120 extending between a central hub 124 and an outer ring 128, which surrounds the spring 100. The central hub 124 defines a hub aperture 130 that is sized to receive a first end 132 of the stem 54. As shown in FIG. 5, the spokes 120 of the control element 38 extend radially outward from the central hub 124 at an angle. The apertures between the spokes 120 enable fluid pressure at the inlet 26 to operate on the upstream and downstream sides of the control element 38 surfaces equally such that the fluid inlet pressure does not act to urge the control element 38 in the direction H. The control element 38 is configured to slide with the stem 54 relative to the cage 104 and relative to the sleeve 50 between the open and closed positions. In the closed position, the outer ring 128 of the control element 38 cooperates with the seal assembly 108 to prevent fluid from flowing from the inlet 26 to the outlet 30. In particular, a radially outward portion of an upstream end of the outer ring 128 (opposite the spring seat 116) is configured to engage with the radial seal assembly 144 of the valve seat 42 as described in greater detail below. One or more seals may be disposed between the control element 38 and the sleeve 50.

As depicted in FIG. 5, a spacer 134 is coupled to the inlet end of the valve body 14. The spacer 134 is clamped between a flange at the upstream end of the regulator 36 and a corresponding flange (not shown) positioned upstream of the spacer 134 by bolts that span between the flanges and compress gaskets 136 that are positioned between the spacer 134 and each flange (only one such gasket 136 is shown). The spacer 134 can be removed by removing the bolts to enable insertion or removal of the internal components of the regulator 36 (e.g., the seal assembly 108, the actuator assembly 37 components, the control element 38 components, etc.) while the regulator 36 is installed.

Returning briefly to FIG. 5, the pathway 76 formed in the sleeve 50 is partially illustrated. The pathway 76 includes one or more channels having both a lateral portion 202, which is depicted in FIG. 3, and an axial portion hidden from view in FIG. 3. Each lateral portion 202 extends radially inward from the cylindrical wall 66 within a portion of the second plate 72. Each lateral portion 202 of the pathway 76 connects to a bore 204 formed in a downstream surface of the second plate 72 of the sleeve 50 to provide fluid communication between the lateral portion 202 of the pathway 76 and the third chamber 92.

Figure 6:
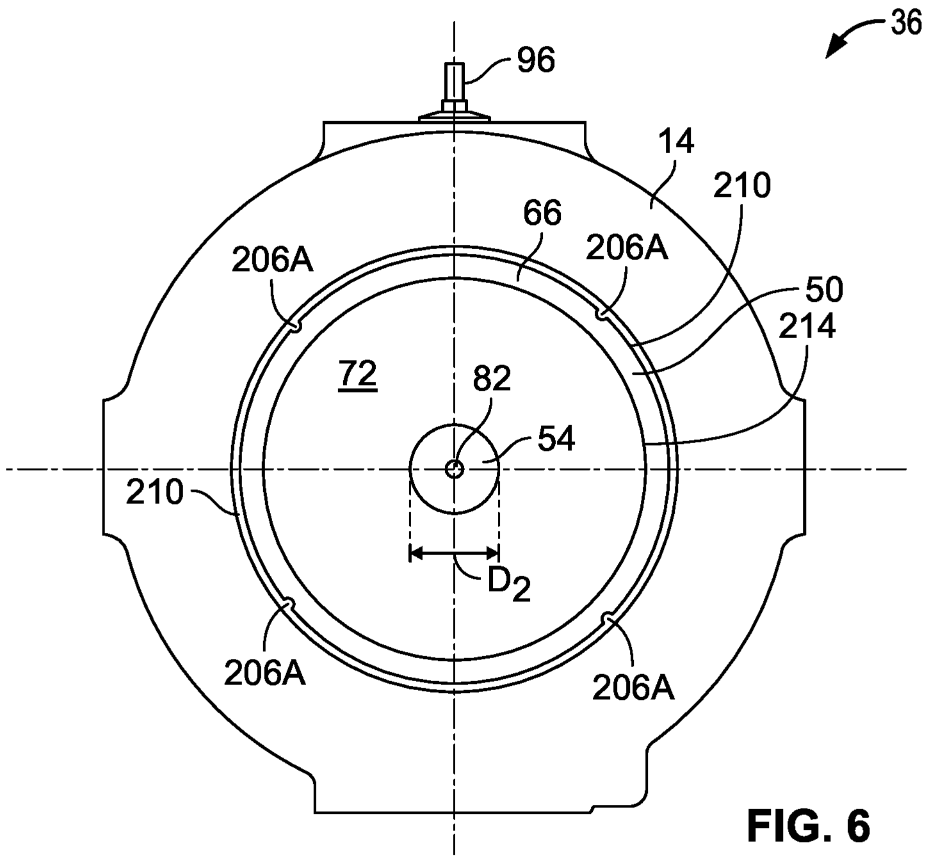
FIG. 6 is a first exemplary cross-sectional view of the regulator of FIG. 3 taken at I-I of FIG. 5.

Turning now to FIG. 6, an exemplary arrangement of an axial portion of the pathway 76 formed in the sleeve 50 is illustrated. Specifically, the axial portion of the pathway 76 includes one or more channels 206A (four channels are shown but more or fewer may be employed in different arrangements), where each channel 206A extends through the cylindrical wall 66 of the sleeve 50 to connect the first chamber 88 with the lateral portion 202 of the pathway 76. The channels 206A are formed in an exterior surface 210 of the sleeve 50 such that the pathway 76 is at least partially defined between the sleeve 50 and the valve body 14. The axial portion 206A of the pathway 76 ultimately extends between the lateral portion 202 and the upstream end of the second sleeve portion 50*b*. The downstream surface of the first plate 70 includes one or more grooves that comprise a further portion of the pathway 76 such that the first and third chambers 88, 92 are fluidly connected.

Figure 7:
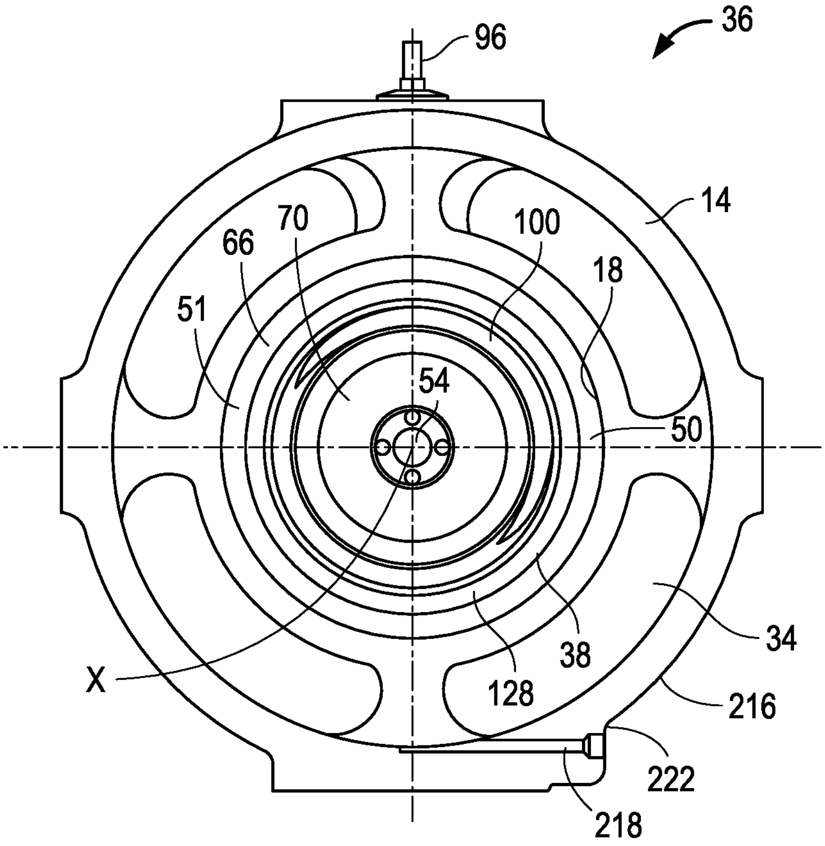
FIG. 7 is a cross-sectional view of the regulator of FIG. 1 taken at II-II of FIG. 5.

FIG. 7 of the regulator 36 illustrates a drain hole 218 that may formed in the valve body 14. The drain hole 218 fluidly couples the flow path 34 of the valve body 14 and the atmosphere, and may provide an access port to drain process fluid remaining in the valve body 14 (e.g., condensation). The drain hole 218 may be sealed with a plug that is accessible from an exterior surface 222 of the valve body 14.

Figure 8A:
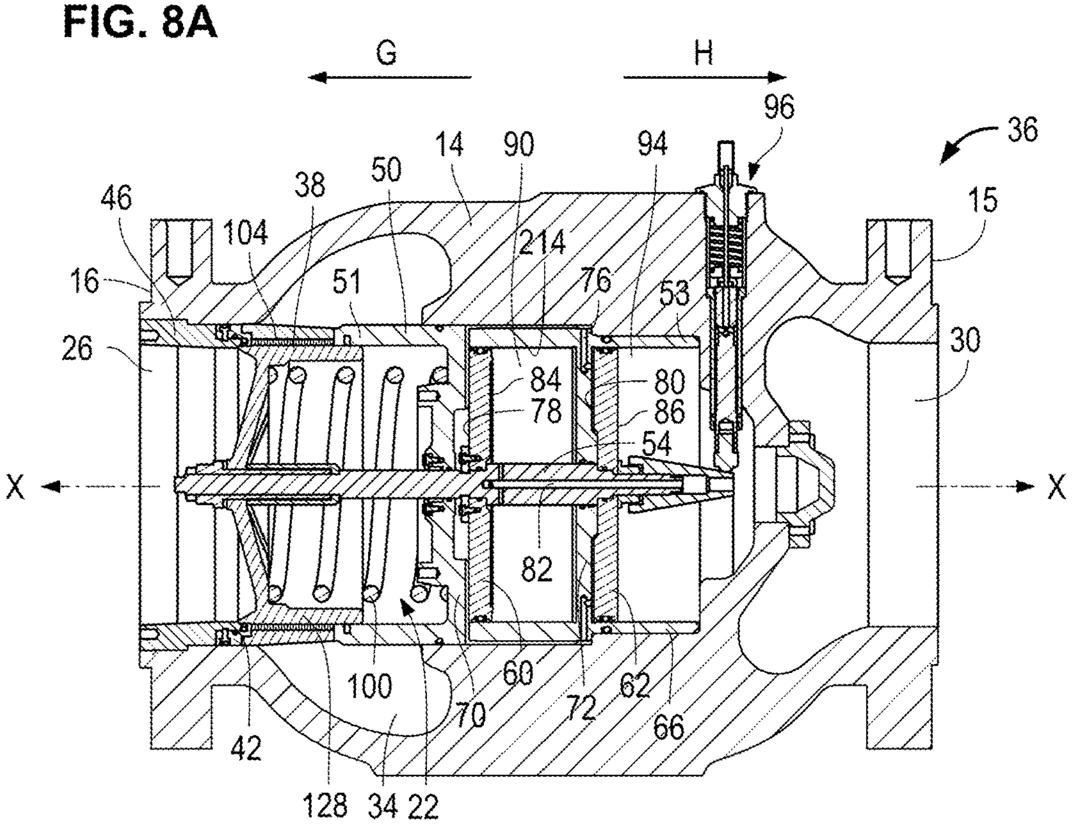
FIG. 8A is a front, cross-sectional view of the regulator of FIG. 3, showing the regulator in the closed position.
Figure 8B:
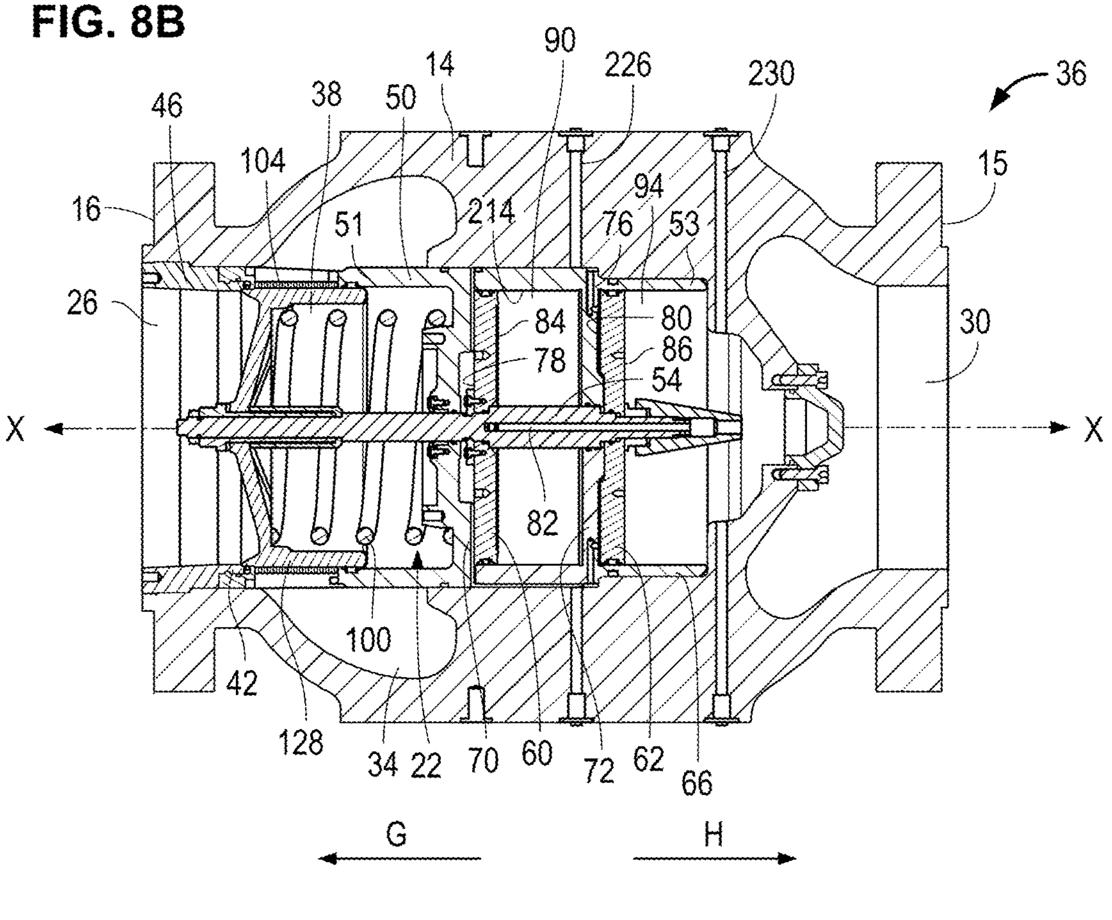
FIG. 8B is a top, cross-sectional view of the regulator of FIG. 3, showing the regulator in the closed position.
Figure 9A:
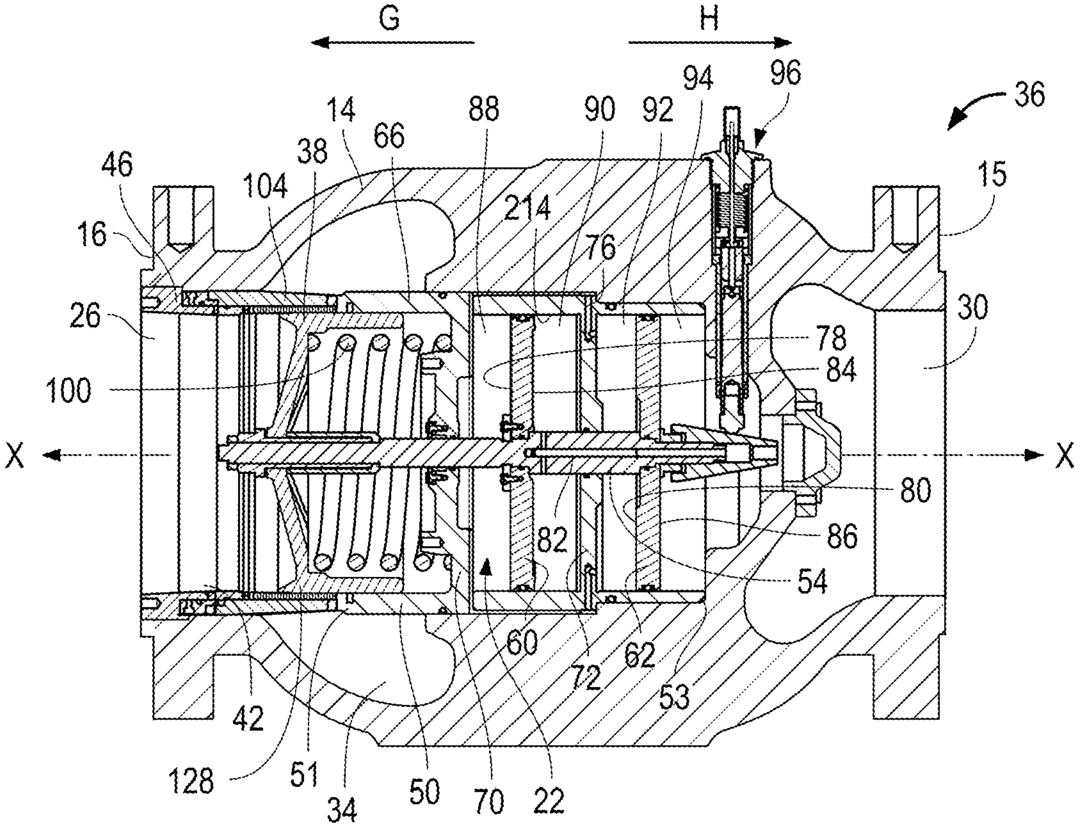
FIG. 9A is a front, cross-sectional view of the regulator of FIG. 3, showing the regulator in a partially open position.
Figure 9B:
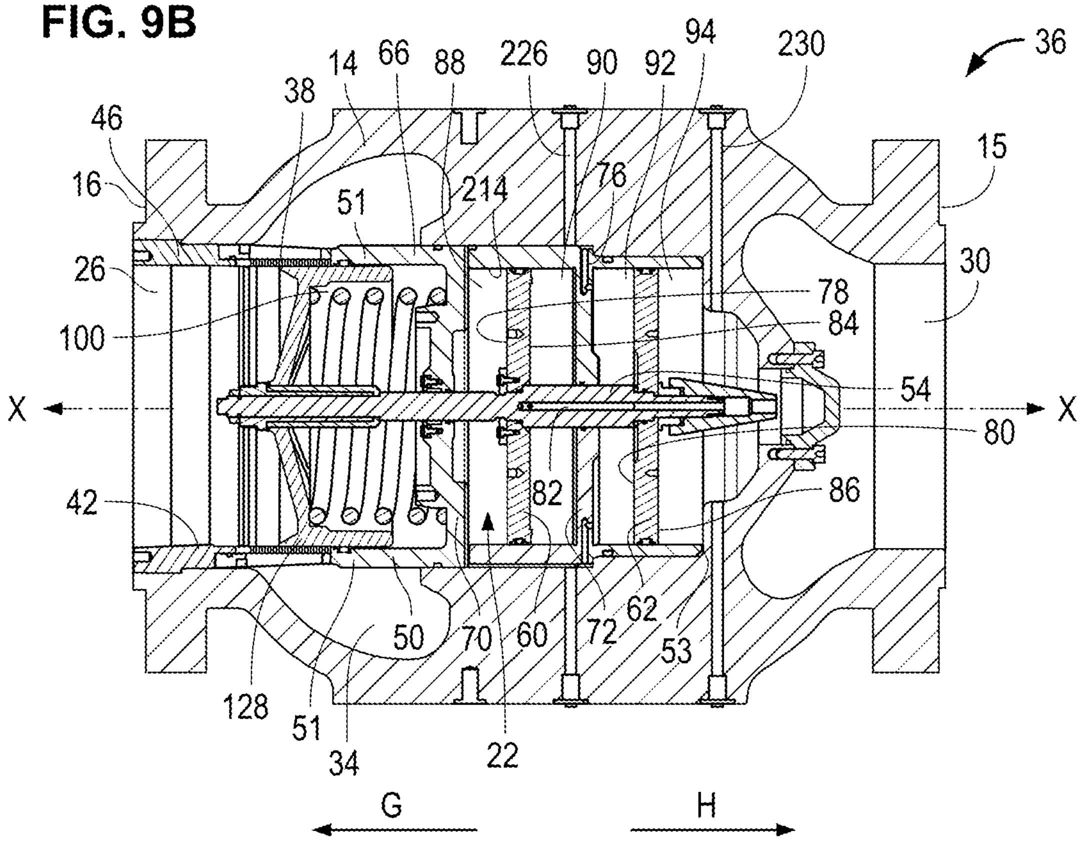
FIG. 9B is a top, cross-sectional view of the regulator of FIG. 3, showing the regulator in a partially open position.
Figure 10A:
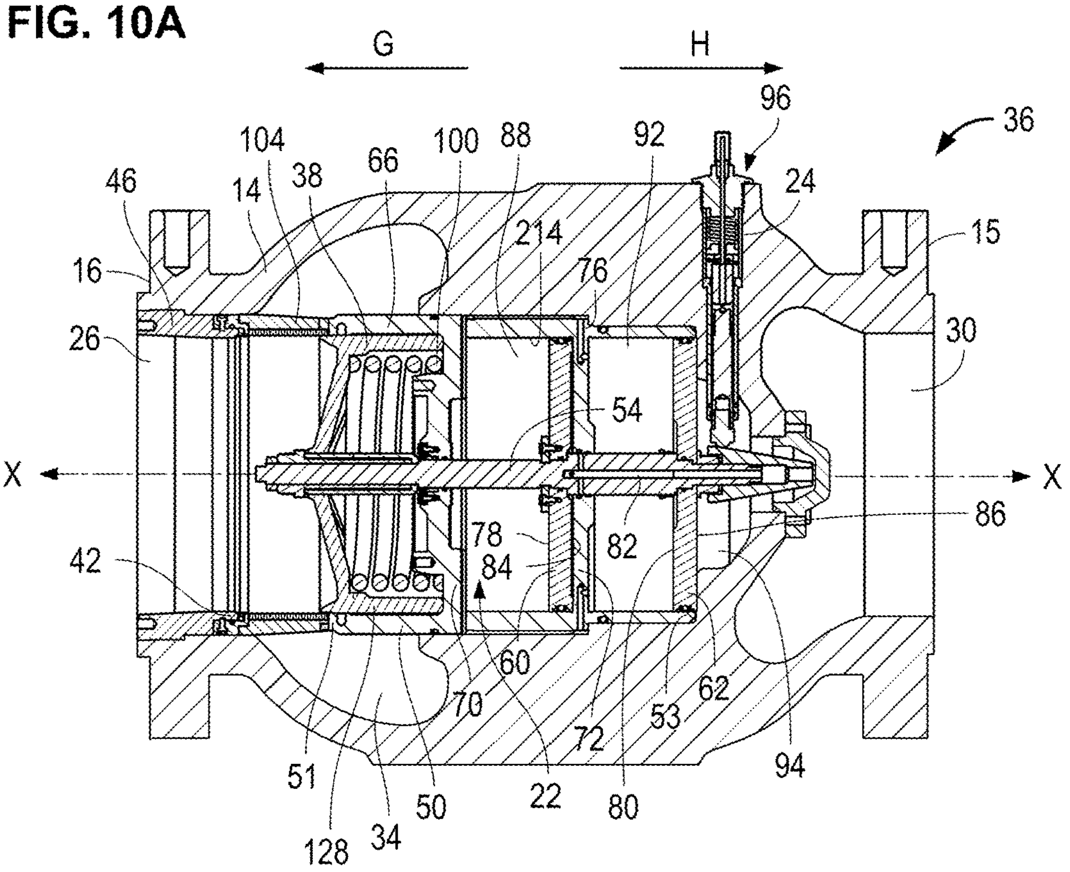
FIG. 10A is a front, cross-sectional view of the regulator of FIG. 3, showing the regulator in the fully open position.
Figure 10B:
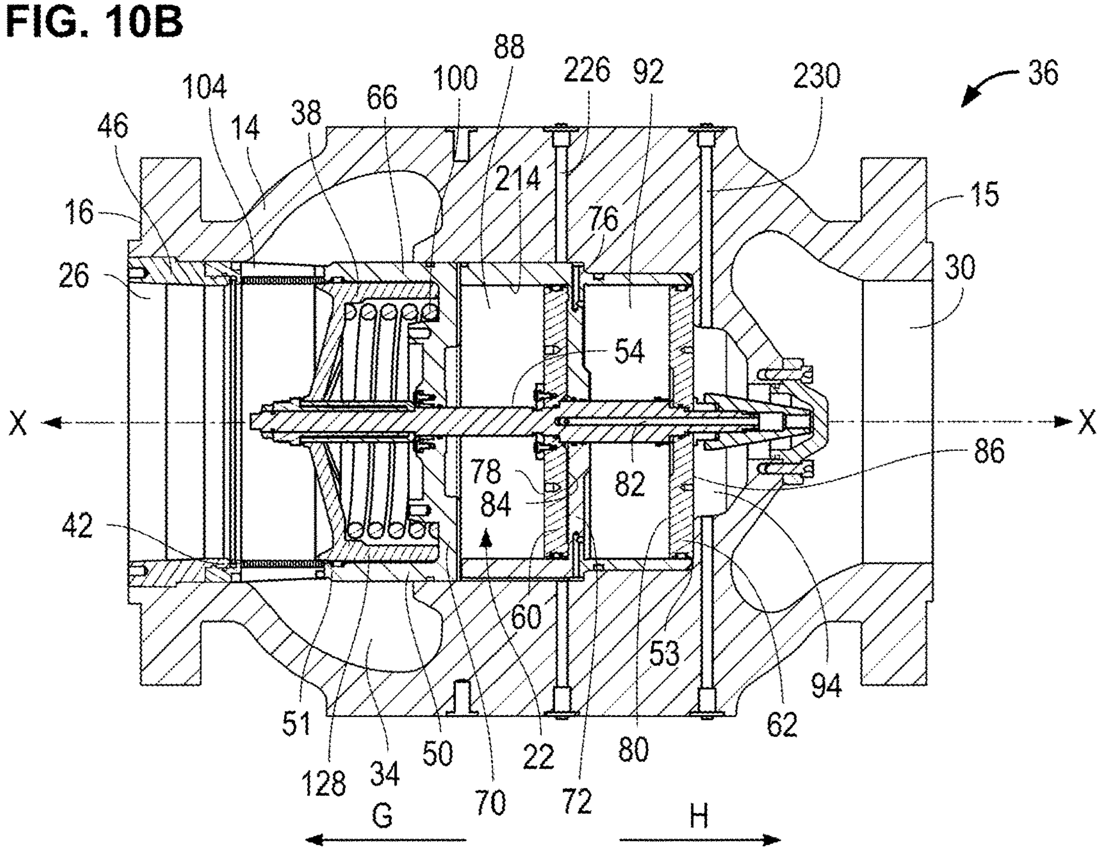
FIG. 10B is a top, cross-sectional view of the regulator of FIG. 3, showing the regulator in the fully open position.

FIGS. 8A, 8B, 9A, 9B, 10A, and 10B illustrate front and top views of the regulator 36 in the closed position (FIGS. 8A, 8B), a partially open position (FIGS. 9A, 9B), and a fully open position (FIGS. 10A, 10B). A pilot device may be operatively coupled to the regulator 36 to control piston movement of the actuator assembly 37 and regulate flow through the regulator 36. In particular, the pilot device may be configured to sense a fluid pressure upstream or downstream of the regulator 36 and adjust a loading pressure that is supplied to actuate the regulator 36 accordingly.

In the illustrated example, a first channel 226 (FIGS. 8B, 9B, 10B) extends laterally (radially outwardly from the longitudinal axis X) through a side wall of the valve body 14 and terminates in the bore 18 to provide an external fluid connection with the pathway 76. The second sleeve portion 50*b* is structured such that the axial portion (e.g., 206A, 206B) of the pathway 76 is fluidly coupled with the first channel 226. As such, the first channel 226 is in fluid communication with the first and third chambers 88, 92 via the pathway 76.

A second channel 230 extends laterally through the side wall of the valve body 14 and terminates in the bore 18 to provide an external fluid connection with the fourth chamber 94. As such, the second channel 230 is in fluid communication with the second and fourth chambers 90, 94 via the passage 82 in the stem 54. The channels 226, 230 may be located in other portions of the valve body 14 and/or may be configured to provide fluid pressure to other portions of the actuator assembly 37 inside the valve body 14. The channels 226, 230 may terminate at a connection fitting (e.g., a tubing fitting) at the exterior surface of the valve body 14 to facilitate connection to sense and loading lines as described below.

In a typical arrangement, the second channel 230 receives downstream pressure via a sense line and the first channel 226 receives a loading pressure from the pilot device via a loading line such that the regulator 36 functions as a pressure reducing regulator. In such an arrangement, when the downstream pressure is at or above the pressure setpoint of the pilot device, the pilot device supplies the downstream pressure as the loading pressure to the first channel 226. Accordingly, the force generated by the spring 100 and the fluid pressure (i.e., the downstream pressure) in the second and fourth chambers 90, 94 operating on the downstream surfaces 84, 86 of the first and second pistons 60, 62, respectively, exceeds the force generated by the fluid pressure (i.e., the downstream pressure) in the first and third chambers 88, 92 operating on the upstream surfaces 78, 80 of the first and second pistons 60, 62, respectively. As a result, the shaft 54 and the connected control element 38 are moved fully in the direction G until the first and second pistons 60, 62 are adjacent the first and second plates 70, 72 and the control element 38 engages the valve seat 42 as shown in FIGS. 8A and 8B. In this position, fluid is prevented from flowing from the inlet 26 to the outlet 30.

When downstream demand increases such that the downstream pressure drops below the pressure setpoint of the pilot device, the pilot device supplies an increased pressure (i.e., a pressure greater than the downstream pressure) as the loading pressure to the first channel 226. At this increased loading pressure, the force generated by the fluid pressure (i.e., the increased loading pressure) in the first and third chambers 88, 92 operating on the upstream surfaces 78, 80 of the first and second pistons 60, 62, respectively, exceeds the force generated by the spring 100 and the fluid pressure (i.e., the downstream pressure) in the second and fourth chambers 90, 94 operating on the downstream surfaces 84, 86 of the first and second pistons 60, 62, respectively. As a result, the shaft 54 and the connected control element 38 are moved in the direction H, which causes the control element 38 to disengage from the seat 42 and enables fluid to flow from the inlet 26 to the outlet 30. The force balance determines the actual position of the shaft 54 and the connected control element 38, and the flow capacity of the regulator 36 increases as the control element 38 moves away from the seat 42 in the direction H to the partially open position in FIGS. 9A and 9B and further to the fully open position in FIGS. 10A and 10B. While the above example describes a typical connection of a pilot device to the first and second channels 226, 230, the regulator 36 can also be configured differently. For example, the first channel 226 may alternatively be connected to the upstream pressure and the second channel 230 may be connected to the loading pressure supplied by a pilot device such that the regulator 36 functions as a backpressure regulator.

Figure 11:
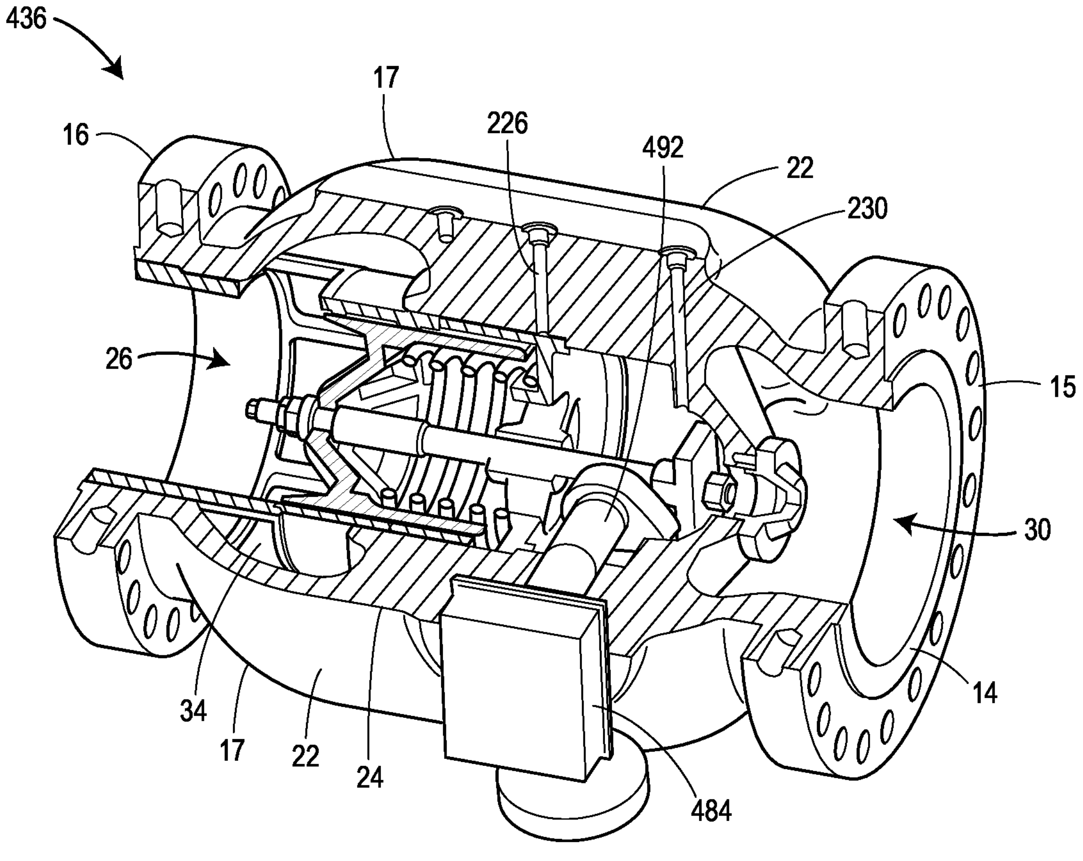
FIG. 11 is a perspective view of the modular valve system of FIG. 1 used with a slam-shut valve.
Figure 12:
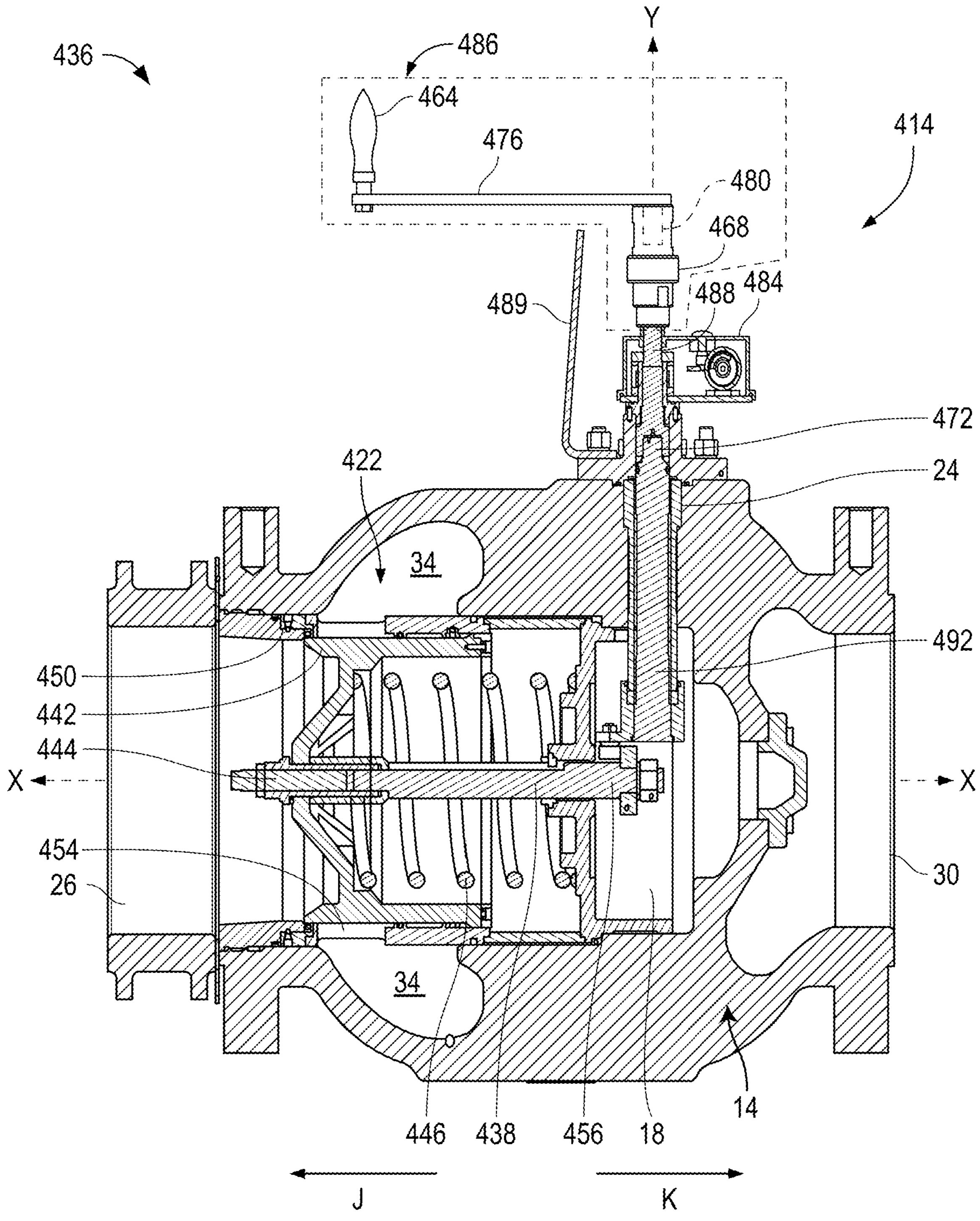
FIG. 12 a cross-sectional side view of the modular valve system and slam-shut valve of FIG. 11, showing the slam-shut valve in a closed position.
Figure 13:
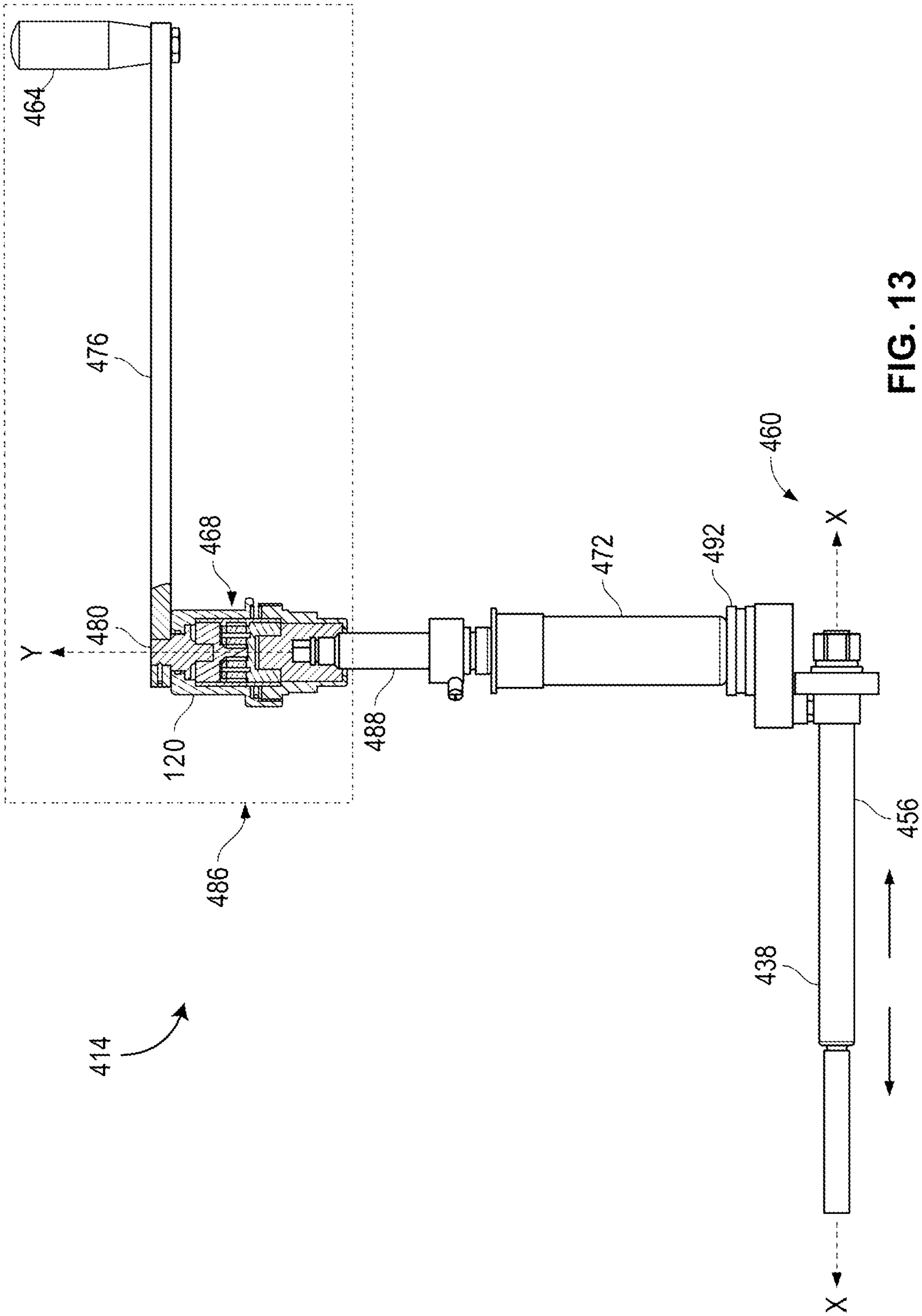
FIG. 13 is a side view of an actuator assembly and valve stem of the slam-shut valve of FIG. 12 assembled in accordance with the teachings of the present disclosure.

Referring now to FIGS. 11-13, another exemplary fluid control device 436 is depicted with the valve body 14 of the modular valve system 10, constructed according to the teachings of the present disclosure. Specifically, the exemplary fluid control device 436 of FIGS. 11-13 is an axial flow slam-shut valve 436 and is operatively coupled to an actuator assembly 414 (FIG. 13). The axial flow slam-shut valve 436 is assembled with the valve body 14 and a valve assembly 422 is in arranged in the valve body 14, such as inserted into the bore 18 of the valve body 14. As previously described, the valve body 14 includes the inlet 26, the outlet 30, and the fluid flow path 34 between the inlet 26 and the outlet 30. The valve body 14 also includes the longitudinal axis X that is coaxially aligned with a longitudinal axis of a valve stem 438. The flow path 34 is arranged outside the valve assembly 422 and the bore 18, so that the flow path 34 is not limited by the size of the valve assembly 422 and can provide greater flow.

The valve assembly 422 includes the valve stem 438, a control element 442 coupled to a first end 444 of the stem 438, and a spring 446. The valve stem 438 and control element 442 of the valve assembly 422 are movable along the longitudinal axis X between an open position, in which the control element 442 is spaced away from a valve seat 450, and a closed position, in which the control element 442 engages the valve seat 450. The control element 442 is biased by the spring 446 toward the closed position, in which the control element 442 sealingly engages the valve seat 450 to prevent fluid flow between the inlet 26 and the outlet 30. In the illustrated example, the valve assembly 422 is arranged inside a valve cage 454 and the flow path 34 is primarily disposed outside the valve assembly 422. A second end 456 of the valve stem 438, opposite the first end 444, is connected to a Scotch Yoke mechanism 460 (FIG. 14) of the actuator assembly 414. The control element 442 moves linearly with the valve stem 438 in a K direction to open the slam-shut valve 436 or in the J direction to close the slam-shut valve 436. While the actuator assembly 414 is described in conjunction with an axial valve, the actuator assembly 414 may be used with any other process control device, for example, linear valves, throttle valves, isolation valves, rotary valves, and/or any other process control device.

The actuator assembly 414, shown in detail in FIG. 13, includes a manual actuation assembly 486, a transmission shaft 472, and a Scotch yoke assembly 460. The manual actuation assembly 486 includes a handle 464, a lever 476, and a transmission mechanism 468. The handle 464, which may be a rotational input device such as a knob, wheel, etc., is used to manually open the slam-shut valve and is connected to the transmission mechanism 68 by the lever 76. An input shaft 480, which may be part of the lever 476 or the transmission mechanism 468, receives a first rotational velocity from the lever 476 and handle 464 and delivers the first rotational velocity to the transmission mechanism 468. More specifically, the lever 476 has a square bore that receives a square end of the input shaft 480 to couple the lever 476 to the transmission mechanism 468. The transmission mechanism 468 is configured to amplify a torque that is delivered via the handle 464 to an output torque that is delivered to the transmission shaft 472. The transmission mechanism 468 is coupled to the transmission shaft 472 and delivers a second rotational velocity and, therefore, an output torque to the shaft 472, which in turn, delivers the second rotational velocity to move the control element 442 via the Scotch yoke mechanism 460. The Scotch yoke mechanism 460 is connected to the second end 456 of the valve stem 438 of the axial flow slam-shut valve 436 and converts the rotational motion of the shaft 472 to linear motion of the valve stem 438 to open (i.e., reset) the slam-shut valve 436. Additionally, the transmission mechanism 468 may be configured to amplify or reduce a first torque of the handle 464 to a second toque of the transmission shaft 472.

Still referring to FIG. 13, the actuator assembly 414 includes a controller 484, such as a trigger mechanism 484, that is responsive to fluid pressure and is arranged outside of the valve body 14. The trigger mechanism 484 is operatively coupled to a first transmission portion 488 of the transmission shaft 472 of the actuator assembly 414. A second transmission portion 492 of the transmission shaft 472 is operatively coupled to the valve stem 438 via the Scotch yoke mechanism 460. In a first mode of operation, the trigger mechanism 484 prevents rotation of the transmission shaft 472 against the biasing force applied by the spring 446 (via the Scotch yoke mechanism 460). In a second mode of operation, the trigger mechanism 484 releases the transmission shaft 472 to allow rotation of the transmission shaft 472 under the biasing force applied by the spring 446 (via the Scotch yoke mechanism 460).

As shown in FIG. 12, the slam-shut valve 436 is in the closed position such that the control element 442 engages the seat 450 to close the slam-shut valve 436. To open the slam-shut valve 436 from this closed position, the handle 464, which is removable from the slam-shut valve 436 and is so removed during normal operation of the valve 436, is connected to the input shaft 480 and rotated in a first direction about a longitudinal axis Y of the transmission mechanism 468. The input shaft 480 activates the transmission mechanism 468, which converts the first rotational velocity of the input shaft 480 to the second rotational velocity of the transmission shaft 472. Rotational motion of the transmission shaft 472 is converted to linear motion by the Scotch yoke mechanism 460, thereby moving the valve stem 438 and the control element 442 in a translational direction K along the longitudinal axis X of the stem 438. As such, the control element 442 moves away from the valve seat 450, opening the slam-shut valve 436. The slam-shut valve 436 is maintained in this open position by the trigger mechanism 484, which prevents rotation of the transmission shaft 472 when no over-pressure or under-pressure condition for which the trigger mechanism 484 has been configured is present (i.e., in a first, normal mode of operation). A relatively small torque applied via the handle 464 is multiplied via the transmission mechanism 468 into a significantly larger torque, thus making the resetting operation to open the slam-shut valve 436 less cumbersome.

When the slam-shut valve 436 is open, fluid can flow through the openings in the cage 454 and into the flow pathway 34, and the slam-shut valve 436 will be maintained in this open position absent any over-pressure or under-pressure condition for which the trigger mechanism 484 has been configured. When an over-pressure or under-pressure condition is detected by the trigger mechanism 484, the trigger mechanism 484 enables the transmission shaft 472 to rotate. By enabling the shaft 472 to rotate, the trigger mechanism 484 thus enables the stem 438 and the control element 442 to move in the direction J under the biasing force provided by the spring 446 until the control element 442 engages the seat 450. In this closed position, fluid is prevented from flowing between the inlet 26 and the outlet 30 of the valve body 14 of the modular valve system 10. When the over-pressure or under-pressure condition is cleared, the slam-shut valve 436 can be reset (i.e., opened) via the handle 464 as described above, for example.

As depicted in the valve body 14 used to assemble the pressure regulating valve 36 of FIGS. 3 to 10B, and in particular FIGS. 8B, 9B, and 10B, the valve body 14 used to assemble the slam-shut valve 436 of FIGS. 11 to 13 may also include the first channel 226 and the second channel 230, as depicted in FIG. 11. More specifically, the first channel 226 extends laterally through a side wall, such as a portion of the outer wall 17, of the valve body 14 and terminates in the bore 18 to provide an external fluid pathway with a pathway, such as the pathway 76 (see, e.g., FIG. 8B). The second channel 230 extends laterally through the side wall, such as a portion of the outer wall 17, of the valve body 14 and also terminates in the bore 18 to provide an external fluid connection with a portion of the bore 18, for example. The first and second channels 226, 230 may operate in manner described relative to regulator 36, for example. In addition, and in one example, the second channel 230 is disposed closer to the end 15 of the valve body 14 than the first channel 226 and disposed adjacent to the first channel 226.

Figure 14:
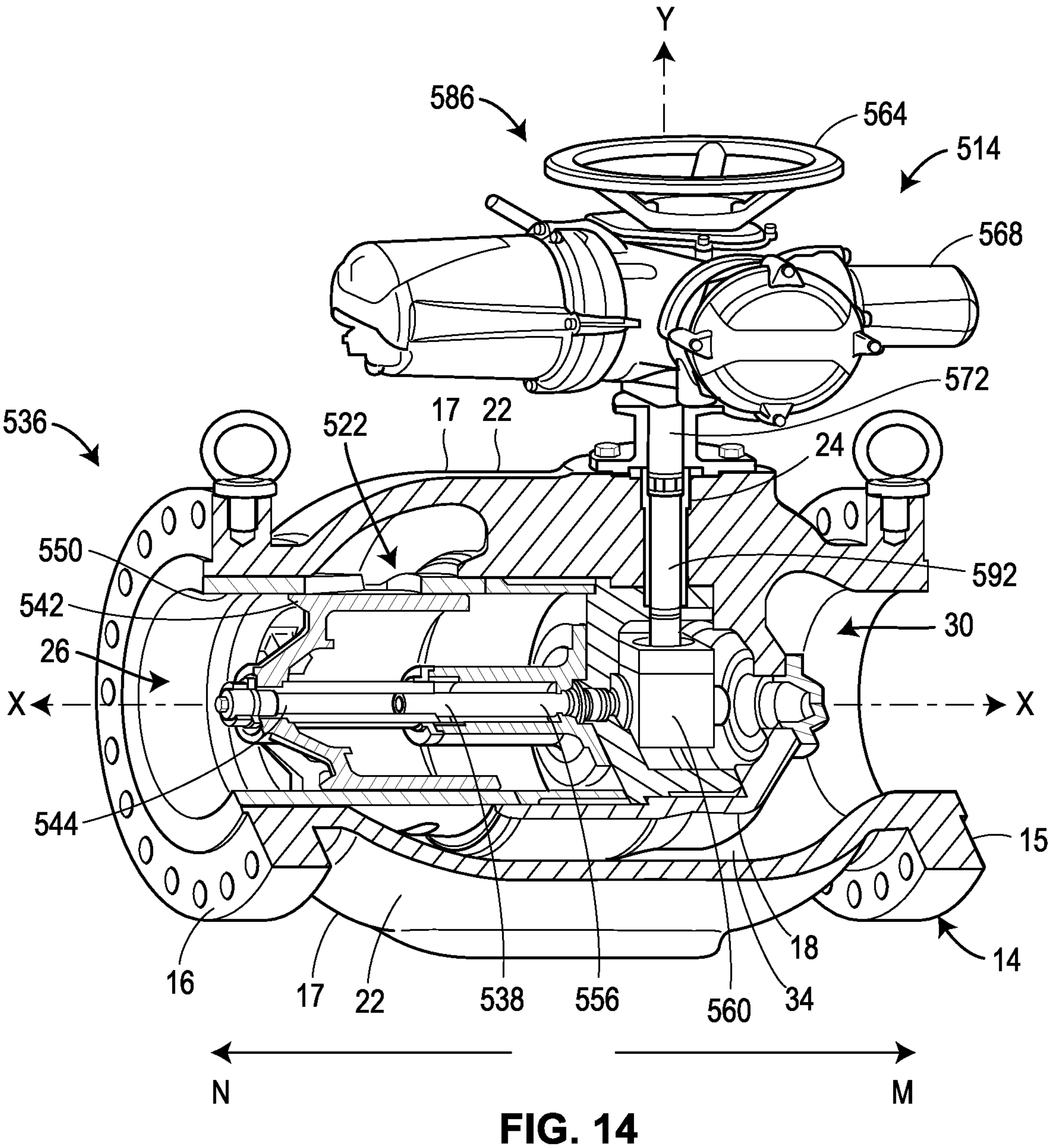
FIG. 14 is a perspective view of the modular valve system of FIG. 1 used with a flow control valve.

Referring now to FIG. 14, another exemplary fluid control device 536 is depicted with the valve body 14 of the modular valve system 10, constructed according to the teachings of the present disclosure. Specifically, the exemplary fluid control device 536 of FIG. 14 is a flow control valve 536 assembled with the valve body 14. The flow control valve 536 is operatively coupled to an actuator assembly 514, such as an electric actuator, disposed outside of the valve body 14 of the modular valve system 10 (FIG. 1). In addition, a valve assembly 522 is arranged in the valve body 14, such as inserted into the bore 18 of the valve body 14. As previously described, the valve body 14 includes the inlet 26, the outlet 30, and the fluid flow path 34 between the inlet 26 and the outlet 30. The valve body 14 also includes the longitudinal axis X that is coaxially aligned with a longitudinal axis of a valve stem 538. The flow path 34 is arranged outside the valve assembly 522 and the bore 18, so that the flow path 34 is not limited by the size of the valve assembly 522 and can provide greater flow.

The valve assembly 522 includes the valve stem 538 and a control element 542 coupled to a part 544 adjacent to the stem 538. The valve stem 538 and the control element 542 of the valve assembly 522 are movable along the longitudinal axis X between an open position, in which the control element 542 is spaced away from a valve seat 550, and a closed position, in which the control element 542 engages the valve seat 550, as in FIG. 14. When the control element 542 is in the closed position, the control element 542 sealingly engages the valve seat 550 to prevent fluid flow between the inlet 26 and the outlet 30 of the valve body 14. In the illustrated example, the flow path 34 is primarily disposed outside the valve assembly 522. In addition, the valve assembly 522 may be arranged inside a valve cage (not depicted). An end 556 of the valve stem 538, opposite the part 544, is connected to a reversing mechanism 560 of the actuator assembly 514. The control element 542 moves linearly with the valve stem 538 in a M direction to open the fluid control valve 536 or in the N direction to close the fluid control valve 536.

The actuator assembly 514 includes a manual actuation assembly 586, an actuator shaft 592, such as a transmission shaft 592, and the reversing mechanism 560. The manual actuation assembly 586 includes the handle 564, which is a rotational input device such as a wheel in this example, used to manually open the flow control valve 536 and is connected to the transmission shaft 592. An input shaft 572, which may be part of the transmission shaft 592, receives a first rotational velocity from the handle 564 and delivers the first rotational velocity to the transmission shaft 592. The transmission shaft 592 is coupled to the reversing mechanism 560 and delivers a second rotational velocity and, therefore, an output torque to the reversing mechanism 560, which in turn, delivers the second rotational velocity to move the control element 542 via the reversing mechanism 560. The reversing mechanism 560 is connected to the second end 556 of the valve stem 538 of the flow control valve 536 and converts the rotational motion of the shaft 592 to linear motion of the valve stem 538 to open (i.e., reset) the flow control valve 536. In this example, the reversing mechanism 560 may include any gear transmission or gearbox having a spur gear, fixed-axis gear structure, turbine worm structure, bevel gear structure, or any other suitable transmission.

As shown in FIG. 14, the flow control valve 536 is in the closed position such that the control element 542 engages the seat 550 to close the flow control valve 536. To open the flow control valve 536 from this closed position, the handle 564, which is removable from the flow control valve 536 is connected to the input shaft 572 and rotated in a first direction about a longitudinal axis Y of the transmission mechanism 568. The input shaft 572 activates the transmission shaft 592, which converts the first rotational velocity of the input shaft 572 to the second rotational velocity of the transmission shaft 592. Rotational motion of the transmission shaft 572 is converted to linear motion by the reversing mechanism 560, thereby moving the valve stem 538 and the control element 542 in a translational direction M along the longitudinal axis X of the stem 538. As such, the control element 542 moves away from the valve seat 550, opening the flow control valve 536. When the flow control valve 536 is open, fluid can flow through the openings in the into the flow pathway 34 of the valve body 14, and the flow control valve 536 will be in this open position. In a closed position, fluid is prevented from flowing between the inlet 26 and the outlet 30 of the valve body 14 of the modular valve system 10.

Figure 15:
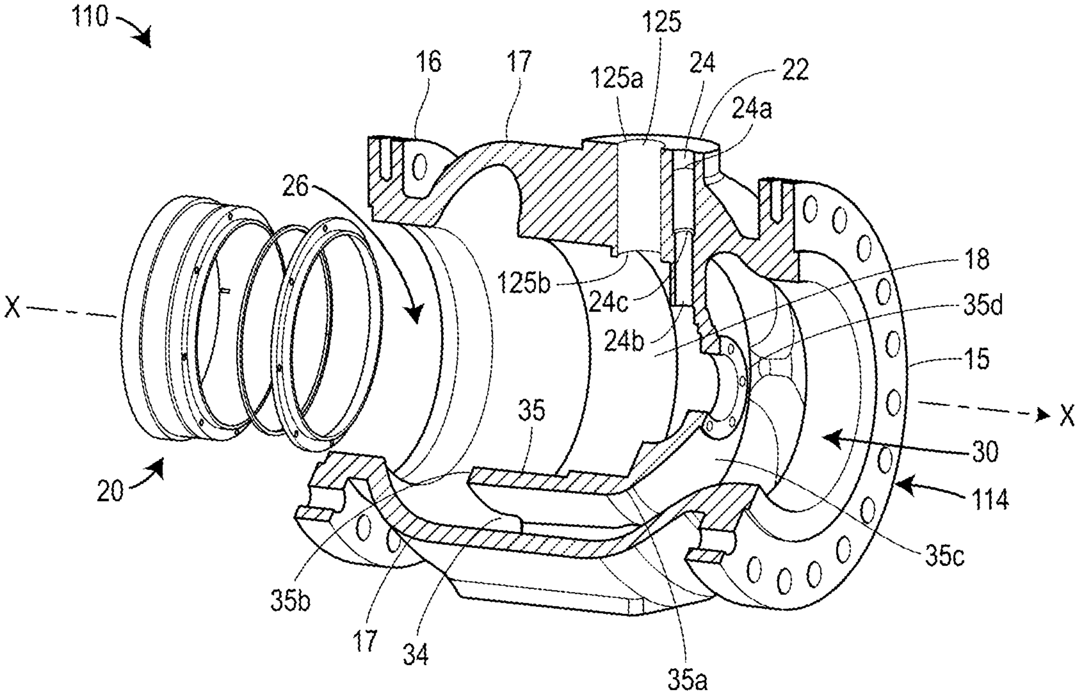
FIG. 15 is a perspective view of another modular valve system assembled in accordance with the teachings of the present disclosure.

Referring now to FIG. 15, an alternative modular valve system 110 in accordance with the teachings of the present disclosure is depicted. The modular valve system 110 is similar to the modular valve system 10 having the valve body 14 of FIGS. 1 to 14, except the modular valve 110 includes an additional through-hole in the valve body, as further explained below. Parts of the modular valve system 110 that are the same as parts of the modular valve system 10 of FIGS. 15-18 include the same reference numbers, some of which are described again only briefly here for frame of reference and others of which are not described again for brevity.

In particular, like the modular valve system 10, the modular valve system 110 of FIGS. 15-18 includes a valve body 114, such as a modular valve body, having the first end 15, the second end 16, the wall 17, such as an outer wall 17, and the central bore 18 disposed between the first end 15 and the second end 16. In one example, the outer wall 17 may be a substantially cylindrical wall, as partially depicted in FIG. 16. As will be appreciated, the outer wall 17 may alternatively take the form, in whole or part, of various other shapes and still fall within the scope of the present disclosure. The bore 18 formed in the valve body 14 is centered on a longitudinal axis X of the valve body 14.

The modular valve system 110 likewise includes the valve disc subassembly 20 disposed near the second end 16 of the valve body when the valve disc subassembly 20 is assembled with the valve body 14, as explained. In addition, the valve body 114 further includes the radial portion 22, which may be disposed on the outer wall 17 of the valve body 114 between the first and second ends 15, 16 of the valve body 114. The valve body 114 also includes the through-hole 24, which may be disposed in the radial portion 22 of the valve body 114, for example. In the valve body 114, the through-hole 24 is a first through-hole and is adapted to receive a component of any one of a variety of different fluid control valves, such as a regulator, a slam-shut valve, and a flow control valve, as explained above.

As further depicted in FIG. 15, the first through-hole 24 includes the first end **24*a* disposed at and extending into the outer wall 17 of the valve body 14 and the second end 24*b* disposed opposite the first end 24*a*. The second end 24*b* of the first through-hole 24 is disposed at and extends into the bore 18 of the valve body 14, providing easy access for a component of any of one a variety of fluid control valves to fit into the first through-hole 24, for example. In addition, the first through-hole 24 may also include a stepped portion 24*c*, which may assist in securing one or more components of any of the regulator, the slam-shut valve, and the flow control valve assembled with the valve body 14**, for example.

The valve body 114 also includes a second through-hole 125 disposed adjacent to the first through-hole 24 and disposed in the wall 17, such as the radial portion 22 of the wall 17, between the first and second ends 15, 16. In one example, and as depicted in FIG. 15, the first through-hole 24 is disposed closer to the first end 15 of the valve body 114 and the second through-hole 125 is disposed closer to the second end 16 of the valve body 114. As described more below relative to each of the various fluid control valves assembled with the valve body 114, one of the first through-hole 24 or the second through-hole 125 is configured to receive a component of each of the pressure regulating valve, the slam-shut valve, and the flow control valve described above. In addition, one of the first through-hole 24 or the second through-hole 125 is adapted to receive a plug 127, 129 (see, e.g., FIGS. 16-18) when the other of one of the first through-hole 24 or the second through-hole 125 receives the component of each of the pressure regulating valve, the slam-shut valve, and the flow control valve.

Further, and like the first through-hole 24, the second through-hole 125 includes a first end **125*a* disposed at and extending into the wall 17 of the valve body 114 and is a radial through-hole. The second through-hole 125 also includes a second end 125*b* disposed opposite the first end 125*a* and disposed at and extending into the bore 18 of the valve body 114. In one example, the second through-hole 125 has a length L with a constant diameter along the length of the second through-hole 125, as depicted in FIG. 15, for example. As will be appreciated, the second through-hole 125** may alternatively include portions along the length having different diameters and still fall within the scope of the present disclosure.

In addition, and again like the modular valve system 10, the valve body 114 of the modular valve system 110 may further include an inner wall 35 disposed within and helping to define the bore 18. The inner wall 35 also helps define the flow path 34 at least disposed between a portion of the outer wall 17 and the inner wall 35. Said another way, the flow path 34 is disposed within the valve body 14 between the first and second ends 15, 16 of the valve body 14 and is separate from the bore 18, due in part to the inner wall 35.

In one example, the inner wall 35 is a cylindrical wall also centered on the longitudinal axis X of the bore 18, as depicted in FIG. 1. However, the inner wall 35 may alternatively take the form of various other shapes and still fall within the scope of the present disclosure. The inner wall 35 has a first end 35*a* disposed near the first end 15 of the valve body 114, and a second end 35*b* disposed near the second end 16 of the valve body 14. A cap portion 35*c* having a center aperture 35*d* may be attached to the first end 35*a* of the inner wall 35. When the inner wall 35 is the cylindrical wall, the cap portion 35*c* may substantially enclose the first end 35*a* of the cylindrical wall 35. In addition, the second end 35*b* of the inner wall 35 is open, allowing one or more portions of any number of fluid control valves, e.g., regulator, slam-shut valve, and flow control valve, to be inserted into the bore 18 of the valve body 114 along an inside portion of the inner wall 35 of the valve body 114. So assembled, the flow path 34 is separate from the bore 18 and disposed on outside portion of the inner wall 35 of the valve body 114.

Figure 16:
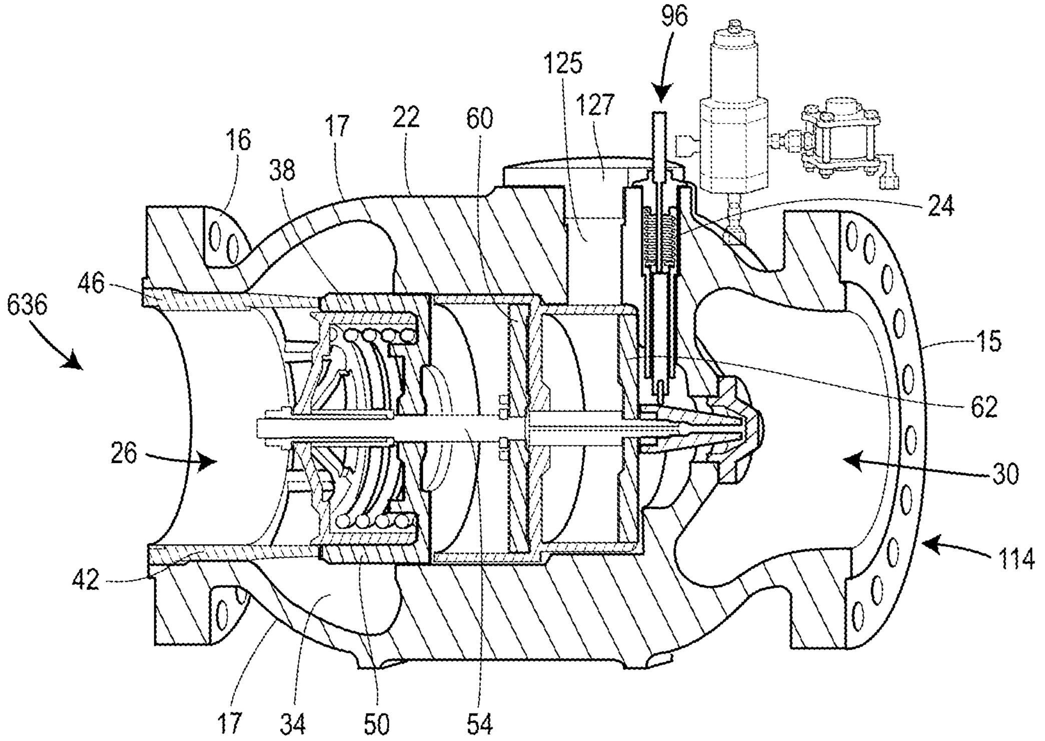
FIG. 16 is a perspective view of the modular valve system of FIG. 15 used with a pressure regulating valve.

Referring now to FIG. 16, an exemplary fluid control valve is assembled with the valve body 114 of the modular valve system 110 of FIG. 15. More specifically, the valve body 114 is used to assemble a pressure regulating valve 636, such as a regulator 636. In particular, the pressure regulating valve 636 includes all of the same parts as the pressure regulating valve 36 described in FIGS. 3-10B, except the pressure regulating valve 36 of FIGS. 3-10B is assembled with the valve body 14 and not the valve body 114 of the alterative modular valve system 110 of FIG. 15. As such, parts of the pressure regulating valve 636 that are the same as parts of the pressure regulating valve 36 use the same reference number and not described in detail again for the sake of brevity.

Components of the pressure regulating valve 636 are inserted into the bore 18 of the valve body 114, and a portion of the pressure regulating valve 636 is inserted into the first through-hole 24 with the plug 127 inserted into the second through-hole 125, as described more below. So configured, the pressure regulating valve 636 uses both the flow path 34 and the valve disc subassembly 20 (not shown) during operation, like any of the other fluid control valves described herein capable of being assembled with the valve body 114 of the present disclosure.

As depicted in FIG. 16, the actuator assembly 37 of the pressure regulating valve 636 is disposed in the bore 18 of the valve body 114. Like the pressure regulating valve 36, the control element 38 is moveable relative to the valve body 114 between a closed position, in which the control element 38 engages the valve seat 42 disposed in the flow path 34, and an open position in which the control element 38 is spaced away from the valve seat 42. The actuator assembly 37 is operatively coupled to the control element 38 and is configured to move the control element 38 axially along the longitudinal axis X to open and close the pressure regulating valve 636. The inlet fitting 46, which is part of the valve disc subassembly 20 of FIG. 15, for example, is coupled to the valve body 114 at the inlet 26 and is configured to retain the actuator assembly 37 and the control element 38 within the bore 18 of the valve body 114.

Like the regulator 36, the actuator assembly 37 of the pressure regulating valve 636 also includes the sleeve 50, the stem 54 extending through the sleeve 50, the first piston 60 coupled to the stem 54, and the second piston 62 coupled to the stem 54 and spaced away from the first piston 60. The sleeve 50, the stem 54, or both the sleeve 50 and the stem 54 provide pathways to permit internal fluid communication to actuate the actuator assembly 37.

As depicted in FIG. 16, the first-through hole 24 receives the indicator assembly 96 that is operatively coupled to the pressure regulating valve 636. Specifically, the indicator assembly 96 is operatively coupled to the stem 54, so that when the control element 38 moves between the open and closed positions, the stem 54 causes the indicator assembly 96 to display a change in position of the control element 38. In addition, the plug 127 is disposed within the second through-hole 125 to block the second through-hole 125.

Referring now to FIG. 17, another exemplary fluid control device is assembled with the valve body 114 of the modular valve body 110 of FIG. 15. More specifically, the valve body 114 is used to assemble a slam-shut valve 736. In particular, the slam-shut valve 736 includes all of the same parts as the pressure regulating valve 436 described in FIGS. 11-13, except the slam-shut valve 436 of FIGS. 11-13 is assembled with the valve body 14 and not the valve body 114 of the alterative modular valve system 110 of FIG. 15. As such, parts of the slam-shut valve 736 that are the same as parts of the slam-shut valve 436 use the same reference number and are not described in detail again for the sake of brevity.

Components of the slam-shut valve 736 are inserted into the bore 18 of the valve body 114, and a portion of the slam-shut valve 736 is inserted into the second through-hole 125 with the plug 129 inserted into the first through-hole 24, as described more below. So configured, the slam-shut valve 636 uses both the flow path 34 and the valve disc subassembly 20 (not shown) during operation, like any of the other fluid control valves described herein capable of being assembled with the valve body 114 of the present disclosure.

While not depicted in FIG. 17, the slam-shut valve 736 may also be coupled to an actuator assembly, such as the actuator assembly 414 of FIGS. 11-13. In addition, the valve assembly 422 of the slam-shut valve 736 is arranged in the valve body 114, such as inserted into the bore 18 of the valve body 114. As explained in detail above, the valve assembly 422 includes the valve stem 438 and the control element 442 coupled to the first end 444 of the stem 438. The valve stem 438 and control element 442 of the valve assembly 422 are movable along the longitudinal axis X between an open position, in which the control element 442 is spaced away from the valve seat 450, and a closed position, in which the control element 442 engages the valve seat 450. The control element 442 is biased toward the closed position, in which the control element 442 sealingly engages the valve seat 450 to prevent fluid flow between the inlet 26 and the outlet 30. The second end 456 of the valve stem 438, opposite the first end 444, is connected to the shaft 492, such as an actuator shaft, of the actuator assembly 414.

As further depicted in FIG. 17, the actuator shaft 492 is disposed in the second through-hole 125 and is operatively coupled to the trigger mechanism 484, as explained in detail above relative to the slam-shut valve 436. The plug 129 is then disposed in the first through-hole 24 to block the first through-hole 24.

Referring now to FIG. 18, another exemplary fluid control device is assembled with the valve body 114 of the modular valve body 110 of FIG. 15. More specifically, the valve body 114 is used to assemble another flow control valve 836. In particular, the flow control valve 836 includes all of the same parts as the flow control valve 536 described in FIG. 14, except the flow control valve 536 of FIG. 14 is assembled with the valve body 14 and not the valve body 114 of the alterative modular valve system 110 of FIG. 15. As such, parts of the flow control valve 836 that are the same as parts of the flow control valve 536 use the same reference number and are not described in detail again for the sake of brevity.

Components of the flow control valve 836 are inserted into the bore 18 of the valve body 114, and a portion of the flow control valve 836 is inserted into the second through-hole 125 with the plug 129 inserted into the first through-hole 24, as described more below. So configured, the slam-shut valve 636 may use both the flow path 34 and the valve disc subassembly 20 (not shown) during operation, like any of the other fluid control valves described herein capable of being assembled with the valve body 114 of the present disclosure.

In FIG. 18, the flow control valve 836 includes the valve assembly 522 arranged in the valve body 14, such as inserted into the bore 18 of the valve body 114. The valve assembly 522 includes the valve stem 538 and the control element 542 coupled to the part 544 adjacent to the stem 538. The valve stem 538 and the control element 542 of the valve assembly 522 are movable along the longitudinal axis X between an open position, in which the control element 542 is spaced away from the valve seat 550 (FIG. 14), and a closed position, in which the control element 542 engages the valve seat 550. When the control element 542 is in the closed position, the control element 442 sealingly engages the valve seat 550 to prevent fluid flow between the inlet 26 and the outlet 30 of the valve body 114.

The end 556 of the valve stem 538, opposite the part 544, is connected to the reversing mechanism 560 of the actuator assembly 514. In addition, shaft 592 of the actuator assembly 514 is also coupled to the reversing mechanism 560. The shaft 592 delivers a rotational velocity and, therefore, an output torque to the reversing mechanism 560, which in turn, delivers the rotational velocity to move the control element 542 via the reversing mechanism 560. The reversing mechanism 560 converts the rotational motion of the shaft 592 to linear motion of the valve stem 538 to open (i.e., reset) the flow control valve 536.

As further depicted in FIG. 18, the shaft 592, such as the actuator shaft, of the actuator assembly 514 coupled to the flow control valve 836 is disposed in and/or received by the second through-hole 125 of the valve body 114 of the modular valve system 110. In addition, the plug 129 is inserted into the first through-hole 24 to block the first through-hole 24 when the actuator 592 of the flow control valve 836 is disposed in the second through-hole 125.

In view of the foregoing, it will be appreciated that the modular valve systems 10, 110 may incorporate different configurations of valves and actuator assemblies, such as any of the pressure regulating valves 36, 636, the slam-shut valves 436, 736, and the flow control valves 536, 836 described above. In particular, the valve body 14, 114 can be used as the pressure regulating valve 36, 636 after being mechanically processed, having an actuator assembly 37 inserted into the valve body 14, 114, for example, and coupled to an external pilot through the through-hole 24. In addition, the valve body 14, 114 can also be used as the slam-shut valve 436, 736 after being mechanically processed, having the valve assembly inserted into the valve body 14, 114, and drilled into a controller or a control box, such as the scotch yoke mechanism 460 of the actuator assembly describe above. Still father, the valve body 14, 114 can also be used as the flow control valve 536, 836 after machining, having the valve assembly inserted into the valve body 14, 114 and coupled to the reversing mechanism and an actuator, such as the actuator shaft of an electric actuator, through the through-hole.

The standardized, generalized valve body 14, 114 of each of the modular valve systems 10, 110 can be used with the actuator assembly and valve assemblies of each of the pressure regulating valves 36, 436, the slam-shut valves 436, 736, and the flow control valves 536, 836 as described, reducing production time and costs for these fluid valve devices. Further, compared with traditional products the integrated valve body 14, 114 of the modular valve system 10, 110 can greatly shorten product development time, save product development and production costs, and improve product production efficiency.

The figures and description provided herein depict and describe preferred embodiments of a modular valve system and modular valve body for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for the modular valve system and modular valve body. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A modular valve system, comprising:

a valve body having an inlet, an outlet, an outer wall, a through-hole in the outer wall, and a fluid flow path between the inlet and the outlet;

wherein the valve body is used to assemble any one of a pressure regulating valve, a slam-shut valve, or a flow control valve, and the through-hole in the outer wall is configured to receive a component coupled to or of all of the pressure regulating valve, the slam-shut valve, and the flow control valve, the component including all of: (1) a portion of an indicator assembly operatively coupled to a stem of the pressure regulating valve; (2) a shaft of an actuator assembly coupled to one of the slam-shut valve or the flow control valve; and (3) a plug.

2. The modular valve system of claim 1, the valve body further comprising a first end, a second end, and a radial portion disposed between the first and second ends, the through-hole disposed in the radial portion.

3. The modular valve system of claim 1, wherein the valve body is configured to receive any one of: (1) an actuator assembly of the pressure regulating valve; and (2) a valve assembly of one of the slam-shut valve or the flow control valve.

4. The modular valve system of claim 1, the valve body further comprising a bore disposed between the inlet and the outlet.

5. The modular valve system of claim 4, further comprising an inner wall disposed within the bore, a portion of the fluid flow path disposed between the inner wall and the outer wall.

6. The modular valve system of claim 4, the through-hole having a first end and a second end disposed opposite the first end, the first end disposed at and extending into the outer wall of the valve body, and the second end disposed at and extending into the bore.

7. The modular valve system of claim 4, the valve body further comprising a first channel and a second channel, each of the first channel and the second channel disposed through the outer wall and terminating in the bore to provide an external fluid connection with a pathway of a fluid control device.

8. The modular valve system of claim 7, wherein the second channel is disposed closer to the end of the valve body and adjacent to the first channel.

9. The modular valve system of claim 1, further comprising a valve disc subassembly adapted to be disposed near the inlet of the valve body when the valve disc subassembly is assembled with the valve body, and each of the pressure regulating valve, the slam-shut valve, and the flow control valve uses the valve disc assembly when assembled with the valve body.

10. The modular valve system of claim 1, wherein the through-hole includes a first end disposed at and extending into an outer wall of the valve body, a second end disposed opposite the first end and extending into a bore of the valve body, and a stepped portion disposed between the first and second ends.

11. A modular valve system, comprising:

a valve body having an inlet, an outlet, an outer wall, a through-hole in the outer wall, and a fluid flow path between the inlet and the outlet;

wherein the valve body is used to assemble any one of a pressure regulating valve, a slam-shut valve, or a flow control valve, and the through-hole in the outer wall is configured to receive a component coupled to or of all of the pressure regulating valve, the slam-shut valve, and the flow control valve, and the through-hole is configured to receive all of a plug, an actuator shaft coupled to one of the slam-shut valve or the flow control valve, and a portion of a travel indicator assembly operatively coupled to a stem of the pressure regulating valve.

12. The modular valve system of claim 11, the valve body further comprising a first end, a second end, and a radial portion disposed between the first and second ends, the through-hole disposed in the radial portion.

13. The modular valve system of claim 11, wherein the valve body is configured to receive any one of: (1) an actuator assembly of the pressure regulating valve; and (2) a valve assembly of one of the slam-shut valve or the flow control valve.

14. The modular valve system of claim 11, the valve body further comprising a bore disposed between the inlet and the outlet.

15. The modular valve system of claim 14, further comprising an inner wall disposed within the bore, a portion of the fluid flow path disposed between the inner wall and the outer wall.

16. The modular valve system of claim 14, the through-hole having a first end and a second end disposed opposite the first end, the first end disposed at and extending into the outer wall of the valve body, and the second end disposed at and extending into the bore.

17. The modular valve system of claim 14, the valve body further comprising a first channel and a second channel, each of the first channel and the second channel disposed through the outer wall and terminating in the bore to provide an external fluid connection with a pathway of a fluid control device.

18. The modular valve system of claim 17, wherein the second channel is disposed closer to the end of the valve body and adjacent to the first channel.

19. The modular valve system of claim 11, further comprising a valve disc subassembly adapted to be disposed near the inlet of the valve body when the valve disc subassembly is assembled with the valve body, and each of the pressure regulating valve, the slam-shut valve, and the flow control valve uses the valve disc assembly when assembled with the valve body.

20. The modular valve system of claim 11, wherein the through-hole includes a first end disposed at and extending into an outer wall of the valve body, a second end disposed opposite the first end and extending into a bore of the valve body, and a stepped portion disposed between the first and second ends.

* * * * *